United States Patent [19]

Toyama et al.

[11] Patent Number: 5,351,252

[45] Date of Patent: Sep. 27, 1994

[54] TECHNIQUE OF REDUCING THE KERR EFFECT AND EXTENDING THE DYNAMIC RANGE IN A BRILLOUIN FIBER OPTIC GYROSCOPE

[75] Inventors: Keiichiro Toyama, Los Altos, Calif.; Byoung Y. Kim, Seoul, Rep. of Korea; Shangyuan Huang, Willowdale, Canada; Herbert J. Shaw, Stanford, Calif.

[73] Assignee: The Board of Trustees of the Leland Stanford University, Stanford, Calif.

[21] Appl. No.: 23,672

[22] Filed: Feb. 26, 1993

[51] Int. Cl.$^5$ ............................................. H01S 3/083
[52] U.S. Cl. ..................................... 372/29; 356/350; 372/94
[58] Field of Search ..................... 356/349, 350; 372/3, 372/6, 9, 26, 29-31, 33, 94

[56] References Cited

U.S. PATENT DOCUMENTS

| | | | |
|---|---|---|---|
| 4,159,178 | 6/1979 | Vali et al. | 356/350 |
| 4,396,290 | 8/1983 | Morris | 356/350 |
| 4,530,097 | 7/1985 | Stokes et al. | 372/6 |
| 5,018,857 | 5/1991 | Sanders et al. | 356/350 |
| 5,064,288 | 11/1991 | Dyes et al. | 356/350 |

OTHER PUBLICATIONS

"Possibility of Using an Optical Fiber Brillouin Ring Laser for Inertial Sensing," by P. J. Thomas, et al., *Applied Optics*, vol. 19, No. 12, Jun. 15, 1990, pp. 1906–1908.

"Optical Fibre Brillouin Ring Laser Gyroscope," by R. K. Kadiwar, et al., *Electronics Letters*, vol. 25, No. 25, Dec. 7, 1989, pp. 1729–1731.

"Fundamentals of a Fiber Integrated Brillouin Ring Laser Gyro," by W. Bernard, et al., *Symposium Gyro Technology* 1991, Stuttgart, Germany (21 pp).

"Stimulated Brillouin Scattering in Monomode Optical Fiber," by D. Cotter, *Journal of Optical Communicator*, vol. 4, No. 1, Mar. 1983, pp. 10–20.

"Evaluation of Performance Parameters of Single-Mode All-Fiber Brillouin Ring Lasers," by P. Bayvel, et al., *Optics Letters*, vol. 14, No. 11, Jun. 1, 1989, pp. 581–583.

"Stimulated Brillouin Scattering," *Nonlinear Fiber Optics*, by G. P. Agrawal, 1989, Academic Press, 1st Edition, Chapter 9, pp. 263–289.

"Stabilized Single-Frequency Stimulated Brillouin Fiber Ring Laser," by Donald R. Ponikvar, et al., *Optics Letters*, vol. 6, No. 8, Aug. 1981, pp. 398–400.

"All Fiber Stimulated Brillouin Ring Laser with Submilliwatt Pump Threshold," by L. F. Stokes, et al., *Optics Letters*, vol. 7, No. 10, Oct. 1982, pp. 509–511.

"Stimulated Brillouin Fiber-Optic Laser Gyroscope," by F. Zarinetchi, et al., *Optics Letters*, vol. 16, No. 4, Feb. 15, 1991, pp. 229–231.

"Laser Phase and Frequency Stabilization Using an Optical Resonator", by R. W. P. Drever, et al., *Applied Physics*, B 31, 1983, pp. 97–105.

*Primary Examiner*—John D. Lee
*Attorney, Agent, or Firm*—Knobbe, Martens, Olson & Bear

[57] ABSTRACT

A Brillouin fiber optic gyroscope having a feedback system which monitors the difference between counterpropagating Brillouin intensities and utilizes this difference in the form of a correction signal to control one of the circulating pump intensities so as to equalize the circulating pump intensities. The Brillouin fiber optic gyroscope further includes a second feedback system which detects electrical signals proportional to the phase-modulated, counterpropagating intensities in the gyroscope, and utilizes a combination of the electrical signals as an error signal to stabilize the resonant cavity at a length substantially equal to a length midway between the resonant lengths of the counterpropagating pump signals. The Brillouin fiber optic gyroscope of the present invention also provides a dynamic range of the gyroscope rotation rate that is twice the dynamic range of existing gyroscopes.

12 Claims, 21 Drawing Sheets

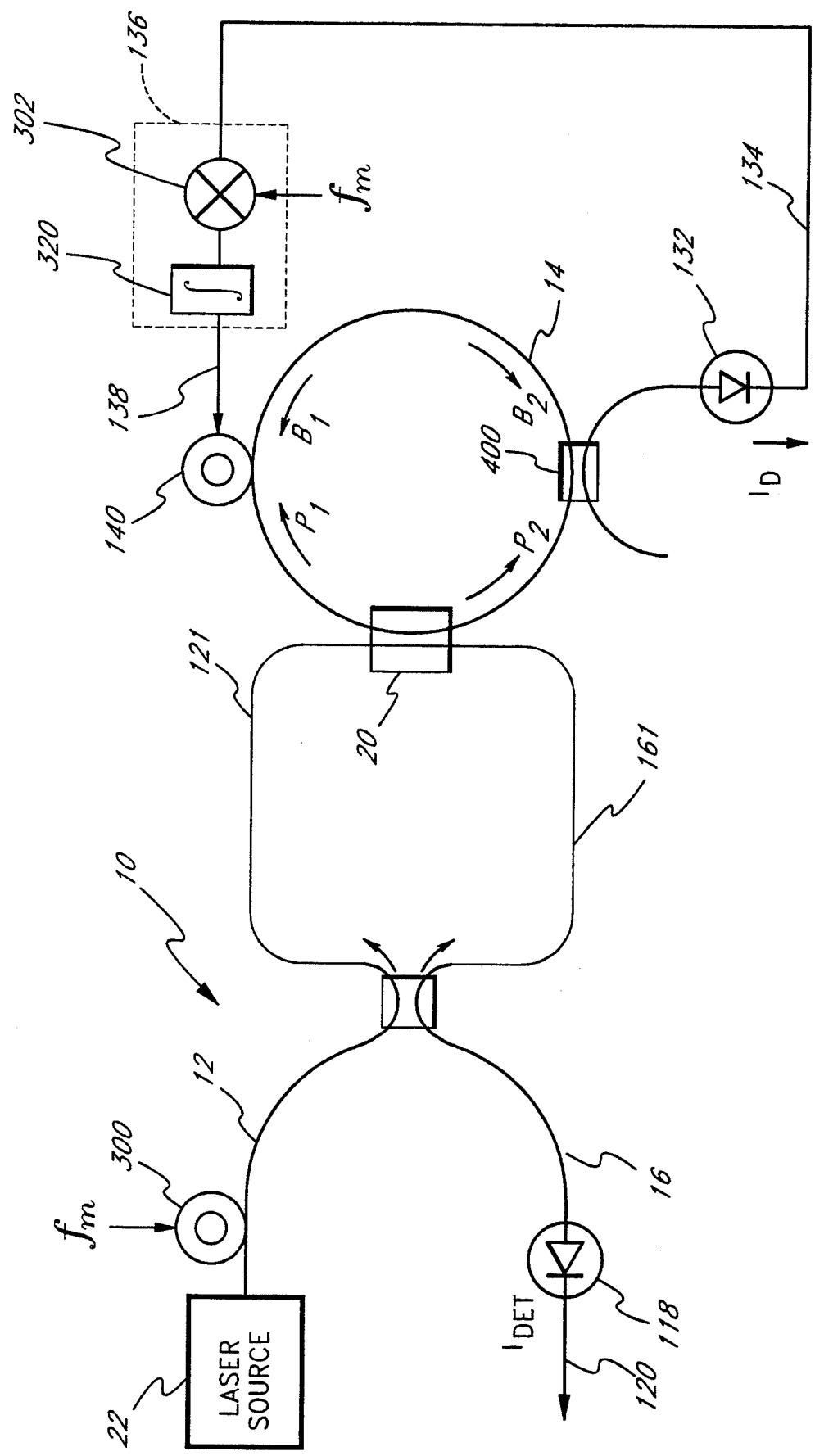

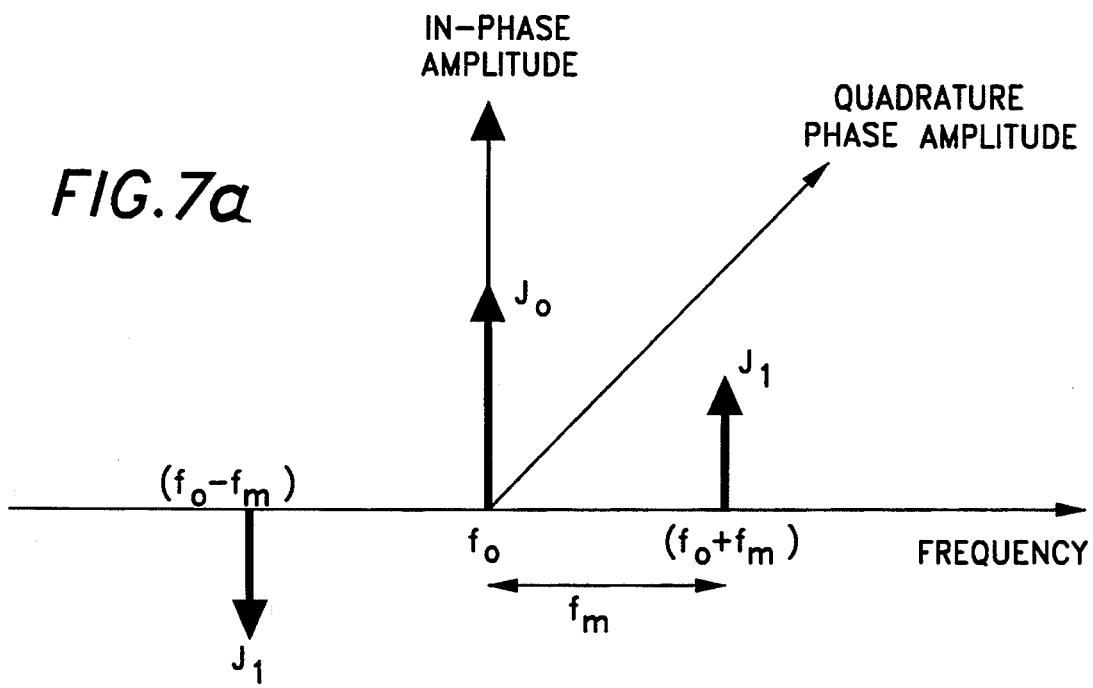
FIG.7a
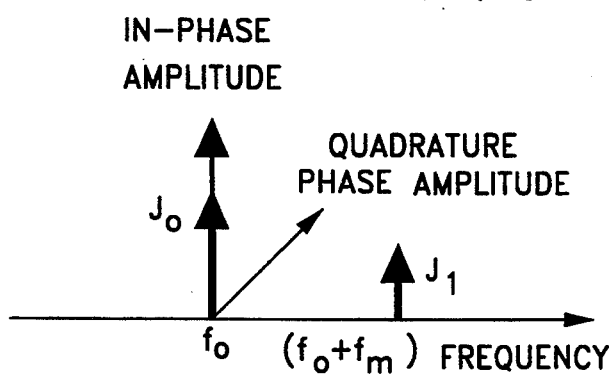
FIG.7b1
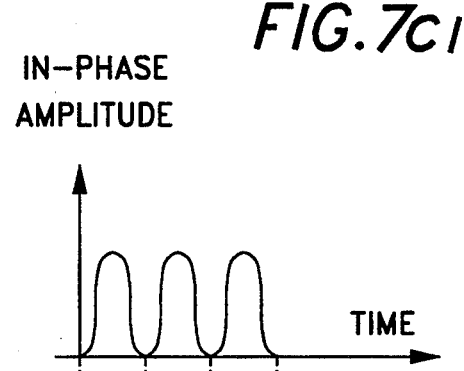
FIG.7c1
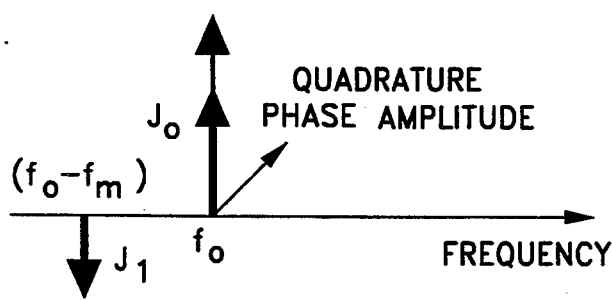
FIG.7b2
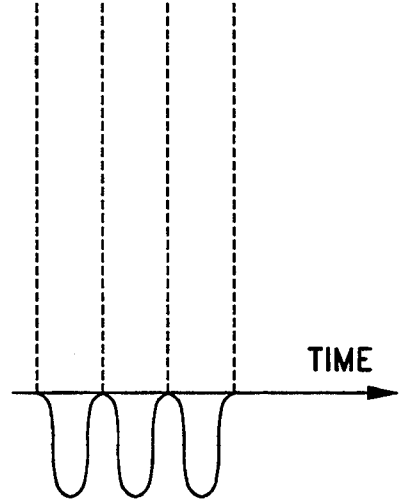
FIG.7c2

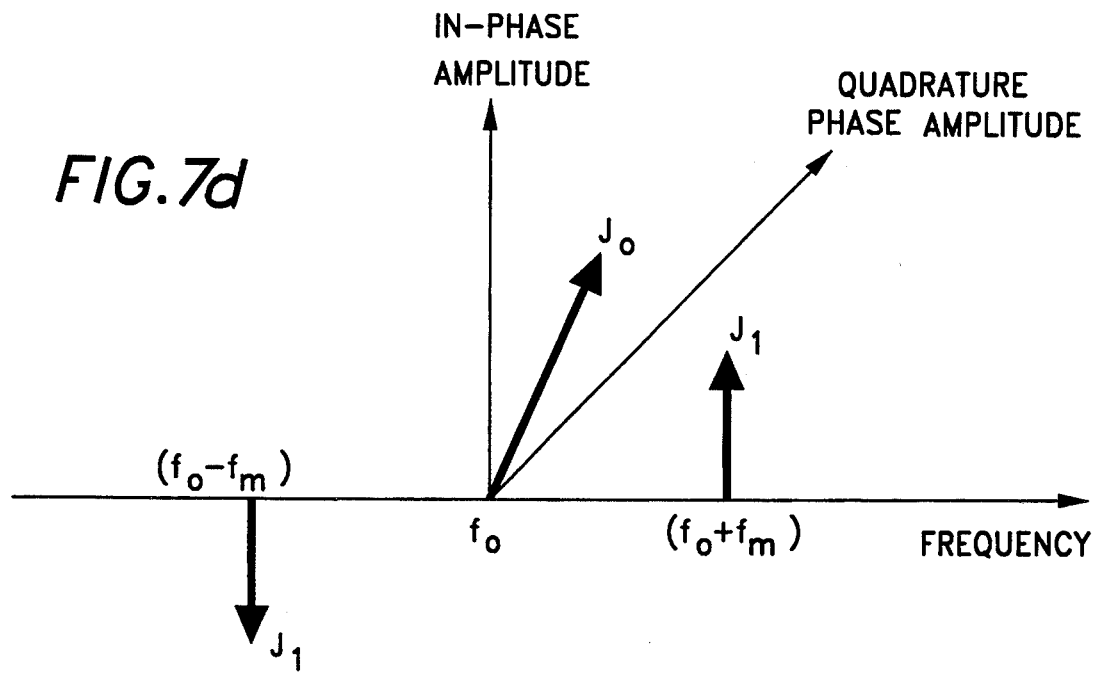
FIG.7d
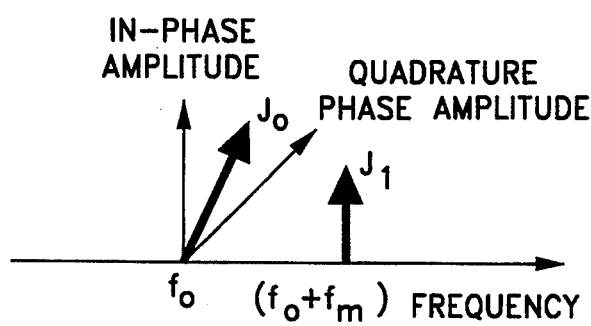
FIG.7e1
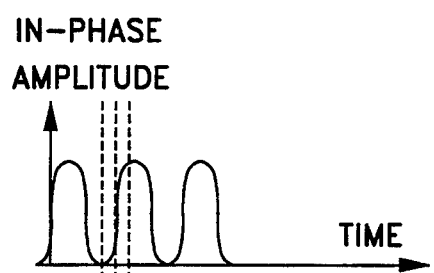
FIG.7f1
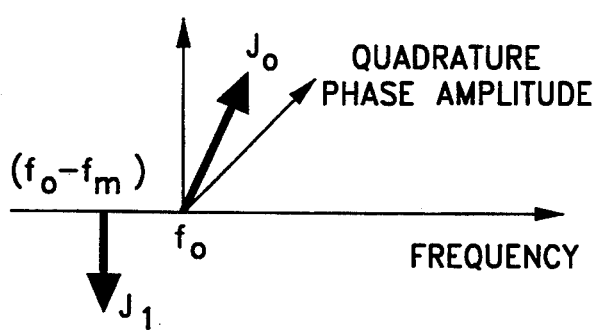
FIG.7e2
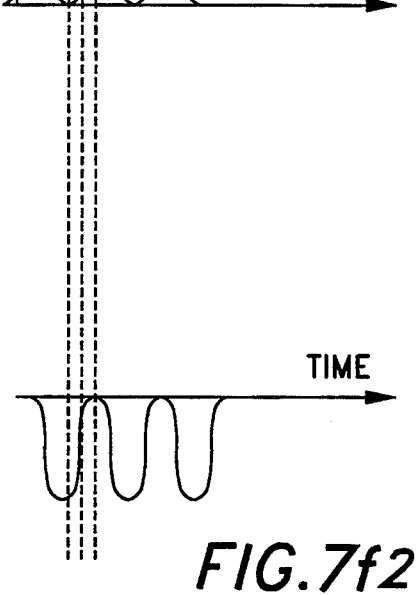
FIG.7f2

TECHNIQUE OF REDUCING THE KERR EFFECT AND EXTENDING THE DYNAMIC RANGE IN A BRILLOUIN FIBER OPTIC GYROSCOPE

Background of the Invention

1. FIELD OF THE INVENTION

The present invention relates generally to Brillouin Fiber Optic Gyroscopes, and more particularly to an apparatus and method for reducing the Kerr effect and extending the dynamic range of a Brillouin Fiber Optic Gyroscope.

2. Description of the Prior Art

Stimulated Brillouin scattering is a non-linear process that can occur in optical fibers as a parametric interaction among a pump wave, a Brillouin wave and an acoustic wave. When the pump wave and the Brillouin wave propagate in an optical fiber, they generate an acoustic wave through the process of electrostriction, which in turn causes a periodic modulation of the refractive index. This index grating scatters the pump light through Bragg diffraction. The scattered light is shifted in frequency because of the Doppler shift associated with a grating moving at the acoustic velocity. When the Brillouin wave is propagating in the opposite direction to the pump wave, and the frequency of the Brillouin wave is lower than the pump wave by the amount equal to the Doppler shift, the scattered light from the pump wave adds constructively to the Brillouin wave. As a result, the Brillouin wave is amplified while the pump wave is attenuated. The frequency difference and the gain bandwidth of this process are determined by the wavelength of the light and material parameters of the fiber. For a wavelength of 1.3 $\mu$m in a silica-based single mode fiber, for example, the frequency difference between the pump wave and the Brillouin wave is bout 13 GHz and the gain bandwidth is about 40 MHz.

Such a phenomenon has been utilized to provide for bidirectional laser oscillations in a Brillouin Fiber Optic Gyroscope (BFOG). As described and claimed in U.S. Pat. No. 4,530,097, entitled "Brillouin Ring Laser", assigned to the assignee of the present invention, a BFOG comprises a laser source which provides pump light into a fiber. U.S. Pat. No. 4,530,097 is incorporated herein by reference. A directional coupler splits the pump light traveling into a resonator into two portions, one traveling in the clockwise (CW) direction and the other in the counterclockwise (CCW) direction. The length of the resonator is adjusted so that the pump frequency matches one of the longitudinal modes in the resonator. When the pump power exceeds the threshold level for Brillouin oscillation, Brillouin waves will start propagating, resulting in bidirectional laser oscillations. The CW and CCW Brillouin light waves are combined to produce an interference signal. Once the gyroscope rotates, the resonant frequencies of the CW and CCW Brillouin laser oscillations separate, and the interference signal produces a beat-frequency which is proportional to the rotation rate of the gyroscope.

There are inherent problems with existing BFOG technology that prevents precise measurement of this rotation rate. One such problem is the beat-frequency offset and its non-linear response resulting from the Kerr effect.

The Kerr effect is a phenomenon that occurs when the refractive index of a fiber seen by a Brillouin signal is slightly modified by the signal's own intensity, as well as other light intensities circulating within the resonant cavity of the BFOG. When the circulating intensities of the CW and CCW Brillouin signals are unequal, there is a net imbalance of the optical path length of the cavity seen by these two waves. This imbalance of the Brillouin intensities of the optical path length translates to a beat-frequency offset. In addition, when the imbalance of the Brillouin intensities is not constant as the rotation rate changes, a non-linear scale factor results.

There are two causes for the imbalance of the Brillouin intensities. One is a result of imbalance of the pump intensities themselves. The pump lights are circulating bidirectionally inside the resonator, and the CW pump provides gain for the CCW Brillouin signal while the CCW pump provides gain for the CW Brillouin signal. Any imbalance of the CW and CCW pump intensities thus results in the imbalance of the Brillouin intensities. Existing BFOG technology utilizes a Y-branch beam splitter or an optical coupler to provide an approximate fifty-fifty power split from a single source. Imperfections in manufacture of the splitter or coupler generally result in an imbalance of the Brillouin intensities obtained from such a split. Unequal loss in the fiber arms connecting the Y-branch or the coupler to the fiber ring resonator also results in an imbalance of the Brillouin intensities. This imbalance of Brillouin intensities in turn results in the scale factor offset through the Kerr effect. The first goal of the present invention is to reduce the problem of the scale factor offset caused by this imbalance of pump intensities.

The second cause of imbalance is due to the "resonant walk-off effect." When the resonant cavity loop is at rest, both pump waves will have a frequency at a resonant frequency of the cavity. Upon rotation of the loop, each of the counter-propagating pump waves will have a different optical path length around the loop, due to the Sagnac effect. The path length for one of the waves increases, while the path length for the other wave decreases. For instance, when the loop is rotated in a CW direction, the CW-traveling pump wave will have a longer optical path around the loop than the CCW-traveling pump wave. This difference in optical path length causes the resonant frequency for each wave to downshift or upshift accordingly.

In a typical BFOG, the cavity length of the resonator is adjusted through an asymmetrical feedback system so that one of the resonant modes, for example, the resonant mode of the CW pump, coincides with the pump frequency. Thus, when the gyro is not rotating, the resonant mode of the CCW pump light equals the resonant mode of the CW pump light. However, once the gyro rotates, the resonant modes seen by the CW pump light and CCW pump light separate, and the CCW pump light is no longer resonant. This results in a lower CCW pump intensity and accordingly, a lower CW Brillouin intensity. Thus, the imbalance of the Brillouin intensity is a function of rotation rate, and the higher the rotation rate, the larger the imbalance resulting in non-linear scale factor. Accordingly, the second goal of the present invention is to eliminate or reduce the power imbalance of the Brillouin intensities under rotation.

The "resonant walk-off effect" also restricts the dynamic range of the gyro rotation rate. As the rotation rate of the gyro increases, the CCW pump intensity decreases to eventually become too low to sustain a CW Brillouin wave. When this happens, the beat signal disappears, and the rotation rate of the gyro cannot be measured.

There are multiple thresholds for different orders of Brillouin lasing in a BFOG. When the pump intensity reaches the first threshold for stimulated Brillouin scattering, the circulating pump power within the resonant cavity is pinned. Any additional pump input power above this pinned level is built up as the first-order Brillouin circulating power. When the first-order Brillouin circulating power reaches the same level as the circulating pump power, which is also the threshold for the second-order Brillouin scattering, the second-order Brillouin circulating wave is generated. The operating window between the first Brillouin threshold and the second Brillouin threshold is referred to as the first operating window of the BFOG.

When the gyroscope is operating at the maximum limit of the first window, i.e., when the input pump power is just below the second-order Brillouin threshold, and when asymmetrical stabilization is employed, the maximum allowed separation of resonator mode frequencies seen by the CW and CCW pump waves in present BFOG technology is $\pm[(\sqrt{3})(\Delta f_c/2)]$, where $\Delta f_c$ is the full width at half maximum of the pump cavity resonance. This occurs where the CW pump is stabilized at resonant peak and when the corresponding CCW pump is operating at 0.25 of the CW pump intensity — the minimum to sustain a Brillouin wave.

Since the operating or dynamic range of a BFOG's rotation rate is limited by the "resonant walk off effect," it is desirable to be able to increase the dynamic range of the rotation rate of present BFOGs. Therefore, the third goal of the present invention is to increase the dynamic range of a BFOG's rotation rate.

SUMMARY OF THE INVENTION

One aspect of the present invention is an apparatus for controlling the circulating intensities in a Brillouin fiber optic gyroscope. The apparatus comprises means for detecting a difference in circulating Brillouin intensities; and means responsive to said difference for controlling the circulating Brillouin intensities.

Another aspect of the present invention is an apparatus for controlling the difference between counterpropagating Brillouin intensities in a Brillouin fiber optic gyroscope responsive to counterpropagating pump signals in a cavity. The apparatus comprises a coupler that taps light from the cavity. A first detector detects a portion of the circulating Brillouin intensities traveling in a first direction in the cavity. A second detector detects a portion of the circulating Brillouin intensities traveling in a second direction in the cavity. A differential amplifier provides an output signal responsive to a difference in intensities detected by the first and second detectors. An integrator integrates the output signal from the differential amplifier and provides an integrated output signal. An intensity attenuator responds to the integrated output signal to selectively attenuate the pump light input to propagate in one direction in the cavity.

Another aspect of the present invention is an apparatus for stabilizing the intensities of counterpropagating signals within the cavity of a Brillouin fiber optic gyroscope. The apparatus comprises a means for introducing counterpropagating pump signals into the cavity, whereby the counterpropagating pump signals have a predetermined frequency selected so that the cavity is resonant to the predetermined frequency when the cavity is at rest. The counterpropagating pump signals cause the generation of counterpropagating Brillouin signals within the cavity. These counterpropagating Brillouin signals have a first frequency and a second frequency. These first and second frequencies have a frequency difference responsive to rotation of the cavity. The apparatus also comprises a means for actively adjusting the length of the cavity when the cavity is rotated to maintain the cavity at a length midway between the resonant lengths of the counterpropagating pump signals.

A further aspect of the present invention is an apparatus for stabilizing the intensities of counterpropagating signals within the resonant cavity of a Brillouin fiber optic gyroscope. The apparatus comprises a means for introducing counterpropagating pump signals into the resonant cavity, whereby the counterpropagating pump signals have a predetermined frequency. The resonant cavity has a first length when the resonant cavity is at rest, the first length is selected to be substantially equal to a resonant length corresponding to the predetermined frequency. The resonant cavity has a first effective length and a second effective length for the counterpropagating pump signals when the resonant cavity is rotating, the first effective length being greater than the first length and the second effective length being less than the first length. The apparatus also comprises a means for detecting intensities of the counterpropagating pump signals and generating detected signals responsive thereto. The intensities vary as the resonant cavity is rotated and the first and second effective Lengths change such that the predetermined frequency of the counterpropagating pump signals is no longer at resonance for either of the counterpropagating pump signal. The apparatus additionally comprises a means responsive to the detected signals for generating a stabilization signal to adjust the length of the resonant cavity to a second length and thereby adjust the first and second effective lengths of the resonant cavity such that the first and second effective lengths differ from the first length by a substantially equal amount, the second length being substantially midway between the first and second effective lengths.

Another aspect of the present invention is an apparatus for stabilizing the intensities of counterpropagating pump signals within a resonant cavity of a Brillouin fiber optic gyroscope. The apparatus comprises a phase modulator comprising a signal generator and a piezoelectric cylinder, a first coupler that taps a first portion of pump intensity traveling in a first direction in the resonant cavity and a second coupler that taps a second portion of pump intensity traveling in a second direction in the resonant cavity. A first detector detects the first portion and generates a first electric signal proportional to the detected first portion. A second detector detects the second portion and generates a second electric signal proportional to the detected second portion. An adder and a synchronous demodulator receives the first and second electrical signals and provide a demodulated sum output signal. An integrator integrates the demodulated sum output signal and provides an integrated output signal. A piezoelectric cylinder driven by the integrated output signal varies the length of the resonant cavity to stabilize the pump intensities. In a preferred embodiment, the phase modulator is connected to the output of a laser source of a Brillouin fiber optic gyroscope. In another embodiment, the phase modulator is connected to the resonant cavity loop of the Brillouin fiber optic gyroscope.

Yet another aspect of the present invention is an apparatus for controlling the circulating intensities in a Brillouin fiber optic gyroscope, and for stabilizing the intensities of counterpropagating Brillouin waves within the resonant cavity of a Brillouin fiber optic gyroscope. The apparatus comprises a means for detecting the difference in circulating Brillouin intensities, a means responsive to the difference in circulating Brillouin intensities for controlling the circulating intensities, a means for detecting counterpropagating pump intensities and a means for combining the counterpropagating pump intensities and for generating a stabilization signal to stabilize the pump intensities at the midpoint between the resonant peaks of the counterpropagating pump intensities.

BRIEF DESCRIPTION OF THE DRAWINGS

FIG. 4b depicts a BFOG configured for resonant peak stabilization through intracavity coupling and phase modulation at the laser source.

FIG. 7a illustrates the carrier signal and two sidebands obtained upon phase modulation at $f_m$ at the laser source when the pump intensities are at resonance.

FIG. 7b1 is a graph of the carrier signal of FIG. 7a and the sideband at frequency $f_o+f_m$, and FIG. 7b2 is a graph of the carrier signal of FIG. 7a and the sideband at frequency $f_o-f_m$.

FIG. 7c1 illustrates the combination of the carrier signal of FIG. 7a and the sideband at frequency $f_o+f_m$, and FIG. 7c2 the combination of the carrier signal of FIG. 7a and the sideband at frequency $f_o-f_m$.

FIG. 7d illustrates the carrier signal and the two sidebands of FIG. 7a when the BFOG is detuned from resonance.

FIGS. 7e1 and 7c2 illustrate the graphs of FIGS. 7b1 and 7b2 when the BFOG is detuned from resonance.

FIGS. 7f1 and 7f2 illustrates the graphs of FIGS. 7c1 and 7c2 when the BFOG is detuned from resonance.

FIG. 9b illustrates the error signal generated to stabilize the resonant cavity at the resonant peak of one of the counterpropagating pump signals as shown in FIG. 9a.

DETAILED DESCRIPTION OF THE PREFERRED EMBODIMENT

The theory of operation of a basic Brillouin Fiber Optic Gyroscope (BFOG) will first be presented, followed by a description of the physical structure and operation of the embodiments of the present invention.

Theory of Operation

The Brillouin laser of the present invention utilizes a fiber optic resonator, described and claimed in U.S. Pat. No. 4,389,090, entitled "Fiber Optic Resonator", and operates as a Brillouin ring laser, as described in U.S. Pat. No. 4,530,097, entitled "Brillouin Ring Laser." Both patents are assigned to the assignee of the present invention, and both patents are incorporated herein by reference.

Figure 1:
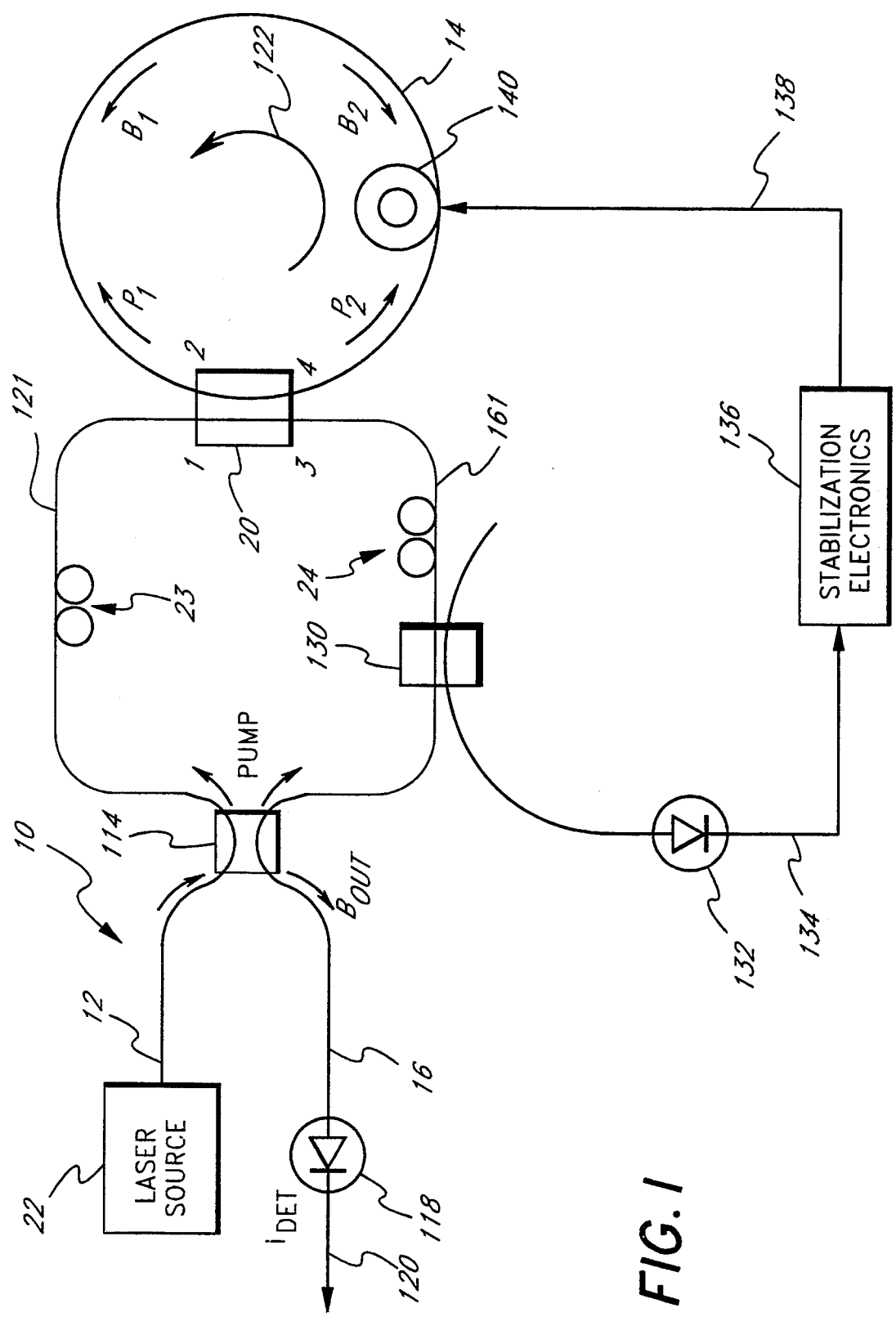
FIG. 1 illustrates a Brillouin fiber optic gyroscope (BFOG) into which the present invention is incorporated.

As shown in FIG. 1, the BFOG comprises a first strand 10 of single mode optical fiber, having a fiber arm portion 121 and a fiber arm portion 161. The BFOG further includes a second strand 14 of single mode optical fiber that forms a loop 14. The fiber arms 121 and 161 of the first fiber 10 are coupled to the loop 14 by a fiber optic, four-port directional coupler 20 having ports 1 and 2 on one side thereof, and having ports 3 and 4 on the other side thereof. The coupler 20 has a coupling coefficient of a few percent (for example, three percent). The fiber arm 121 of the first fiber 10 is coupled to the port 1 of the coupler 20, and the fiber arm 161 is coupled to the port 3 of the coupler 20. The second fiber 14 extends through the coupler 20 via the ports 2 and 4 to form a complete loop.

With reference to FIG. 1, light introduced from a laser source 22 into the input end portion 12 propagates to the port 1 of the coupler 20 through the fiber arm 121, where a portion of the light (e.g., a few percent) is coupled to the port 4, with the remaining portion propagating to the port 3. The light at the port 3 propagates through the fiber arm 161 and out the end of the fiber 10. However, the light at the port 4 traverses the fiber loop 14 and again enters the coupler 20 at the port 2, where a portion is coupled to the port 3 while the remaining propagates to the port 4, and thus propagates back into the fiber loop 14 for recirculation therein.

As described in more detail in U.S. Pat. No. 4,530,097, the loop 14 and the coupler 20 cooperate to provide a resonant cavity so that light entering the coupler 20 at the port 2 interferes with incoming light from the laser source 22. Such interference is constructive at the port 4, while being destructive at the port 3, thereby causing pump light to build up in the resonant cavity loop 14, provided the length of the resonator is properly adjusted.

The fiber portions 12, 16, are passed through a fiber optic, directional coupler 114. The coupler 114 is identical to the coupler 20, except that its coupling constant is set at 0.5 so that approximately 50% of the light propagating through one of the fibers 12, 16 will be coupled to the other of the fiber arms 121, 161, and vice-versa. The laser source 22 is optically coupled to introduce light into the input end portion 12, while a detector 118 is optically coupled to receive light from the end of the output end portion 16. Optionally, a Y-branch beam splitter, not shown, could be used to split and recombine the light in place of the coupler 114.

As the pump light is introduced into the input end portion 12 from the laser source 22, it is divided into two substantially equal portions so that approximately one-half of the pump power is in each of the fiber arm 121 and the fiber arm 161 when the light reaches the coupler 20. At the coupler 20, pump light from the fiber arm 161 is coupled into the fiber loop 14 from the port 3 to the port 2, and light from the fiber arm 121 is coupled to the fiber loop 14 from the port 1 to the port 4, to provide two counterpropagating pump light waves. A first pump light wave P1 propagates in a clockwise (CW) direction in the fiber loop 14, and a second pump light wave P2 propagates in a counterclockwise (CCW) direction in the fiber loop 14.

The loop 14 is constructed to have a length selected to form a resonant cavity at the pump frequency so that the pump light waves P1 and P2 will each build up to a maximum circulating power. Assuming the circulating pump power is above the threshold level for Brillouin oscillation, a portion of the pump energy of each of the waves P1, P2 will be converted into counter-propagating Brillouin waves B1 and B2. Thus, the wave B1 propagates in a direction opposite that of the wave P1 (i.e., in the CCW direction in FIG. 1), and the wave B2 propagates in a direction opposite to that of the wave P2 (i.e., in the CW direction in FIG. 1).

At full resonance, the circulating pump light at the ports 2 and 4 interferes with incoming pump light at the ports 1 and 3, respectively, so that virtually all of the pump light remains in the loop 14, and the pump light output at the ports 1 and 3 is substantially zero. In contrast, the stimulated Brillouin waves B1 and B2 do not interfere significantly with the incoming pump light (because it is at a different frequency from the pump light), and thus, a small fraction of Brillouin light will exit the coupler 20 as it passes therethrough. For example, a fractional portion of the Brillouin wave B1 couples from the port 2 to the port 3 for propagation through the fiber arm 161, while a fractional portion of the Brillouin wave B2 couples from the port 4 to the port 1 for propagation through the fiber arm 121. These fractional portions of the waves B1, B2 are combined by the coupler 114 into a Brillouin output wave $B_{OUT}$ for propagation to the detector 118 via the output end portion 16.

The detector 118 outputs a current $I_{DET}$ on the line 120, which is proportional to the intensity of light impinging thereon. Thus, the detector current $I_{DET}$ will be proportional to the intensity of $I_{BOUT}$ of the Brillouin output wave $B_{OUT}$. The detected intensity of the Brillouin output wave may be expressed as:

$$I_{BOUT} = I_{B1} + I_{B2} + 2\sqrt{I_{B1}I_{B2}} \cos 2\pi (f_{B1} - f_{B2})t \quad (1)$$

where $I_{B1}$ is the intensity of the output portion of the Brillouin wave B1, $I_{B2}$ is the intensity of the output portion of the wave B2, $f_{B1}$ is the frequency of the wave B1, $f_{B2}$ is the frequency of the wave B2, and $f_{B1}-f_{B2}$ is the beat-frequency of the output wave $B_{OUT}$.

At zero rotation rate the frequencies of the two Brillouin waves are the same, so that the interference term (i.e., the cosine term) in Equation (1) is one, and thus the Brillouin wave intensity $I_B$ is a steady state value. However, upon rotation of the loop 14 (e.g., in a counterclockwise (CCW) direction), as indicated by the arrow 122, the counterclockwise propagating Brillouin wave B1 will have a longer optical path around the loop 14 than the clockwise propagating Brillouin wave B2 due to the Sagnac effect. This change in optical path length causes the resonant frequency for stimulated Brillouin oscillation to change for each direction of propagation around the loop. Accordingly, the wave B1 will resonate at a downshifted frequency, and the wave B2 will resonate at an upshifted frequency, thereby yielding a frequency difference therebetween. When the waves are combined to form the output Brillouin wave $B_{OUT}$, the frequency difference causes the Brillouin intensity to periodically vary as a function of the cosine of the frequency difference (i.e., the beat-frequency), as may be seen from Equation (1). Conventional detection electronics (not shown) are connected to receive the electrical signals (i.e., $I_{DET}$) on the line 120, and to thereby detect the frequency of these periodic variations in Brillouin intensity, e.g., by detecting zero crossings in the time domain or by using a Fast Fourier Transform (FFT) spectrum analyzer in the frequency domain.

The fiber arms 121, 161 also include polarization controllers 23, 24, respectively, to provide compensation for fiber birefringence in the arms 121, 161 so that circulating light at the ports 2 and 4 has substantially the same polarization as light from the laser source at the ports 1 and 3. The operation of the polarization controller is also described in more detail in U.S. Pat. No. 4,530,097.

A feedback loop, comprising a coupler 130 with a coupling constant of a few percent, connected to the output fiber portion 16, taps a portion of the power to a photodetector 132. The photodetector 132 outputs a current proportional to the intensity of the tapped power. The output of the photodetector is connected to the input of stabilization electronics 136 via a signal line 134. The output of the stabilizer electronics 136 is connected via a signal line 138 to a piezoelectric (PZT) cylinder 140 in the loop 14. The stabilization electronics 136 control the diameter of the PZT cylinder 140. Basically, the stabilization electronics 136 outputs a signal on the line 138 to drive the PZT cylinder 140 by an amount necessary to restore resonance. This type of stabilization system is fully disclosed in U.S. Pat. No. 4,634,282, which is assigned to the assignees of the present invention and which is incorporated herein by reference. The cylinder 140 stretches the fiber 14 in response to voltage on the line 138 to dynamically vary the length of the fiber loop 14. The stabilization electronics 136 operate to maintain the length of the loop 14 at resonance for the CCW pump signal in the manner described in U.S. Pat. No. 4,634,282.

One of the predominant problems in existing BFOG technology, as described above, is a result of the Kerr effect, which causes a beat-frequency offset and non-linear response. The Kerr effect basically causes non-reciprocity between the two counterpropagating lightwaves in the fiber coil, resulting in spurious rotation signals. It has been found that a power difference as small as 10 nanowatts causes a rotation error which is too large for inertial navigation.

The Kerr effect is a phenomenon that occurs when the refractive index of a fiber seen by a Brillouin signal is slightly modified by the signal's own intensity, as well as by other light intensities circulating within the resonant cavity of the BFOG. As shown in FIG. 1, the waves B1 and B2 are produced respectively by the counterpropagating pump waves P1 and P2 inside the cavity. The refractive index for either Brillouin wave is perturbed by the presence of both Brillouin waves and both pump waves. When all waves in the cavity are in the same eigenpolarization mode, the index perturbations $\delta n$ for the two Brillouin waves are found from basic field equations to be $$\delta n_{B1} = \alpha n_2 (P_{B1} + 2P_{B2} + 2P_{P1} + 2P_{P2})/A_{eff}$$

$$\delta n_{B2} = \alpha n_2 (2P_{B1} + P_{B2} + 2P_{P1} + 2P_{P2})/A_{eff} \qquad (2)$$

where $A_{eff}$ is the effective fiber-core area and $n_2$ is the nonlinear-index coefficient. For linear, circular and elliptical polarizations, $\alpha = 1$, $\alpha = \frac{2}{3}$ and $\frac{2}{3} < \alpha < 1$, respectively. $P_{B1}$, $P_{B2}$, $P_{P1}$ and $P_{P2}$ denote power levels of circulating waves inside the cavity, with subscripts denoting the various waves. Here, only first order Brillouin waves are assumed to be excited.

The Kerr effect can be described as follows. As well known in the art, the terms $P_{B1}$ and $P_{B2}$ in Equations (2) have self-modulation coefficients of unity and cross-modulation coefficients of 2 for the two oppositely propagating waves B1 and B2. They are found, for example, in the interferometric fiber gyro and the passive resonator gyro which have no waves corresponding to the pump waves here. The terms in $P_{P1}$ and $P_{P2}$ behave as cross modulation terms for both Brillouin waves, and therefore all have coefficients of 2.

From Equations (2), a power imbalance of $\Delta P_B = P_{B2} - P_{B1}$ between the Brillouin waves causes a differential index perturbation $\Delta n_B = \Delta n_{B2} - \delta n_{B1}$ between waves B1 and B2. If $f_{B1}$ and $f_{B2}$ are respectively the counterclockwise (CCW) and clockwise (CW) cavity resonant frequencies, a beat-frequency bias $\Delta f_B = f_{B2} - f_{B1}$ occurs due to Kerr effect, where $$\Delta f_B = -f_B \frac{\Delta n_B}{n_B} = \eta \Delta P_B \qquad (3)$$

and $$\eta = \frac{c\alpha n_2}{\lambda_B n_B A_{eff}} \qquad (4)$$

where $\eta$ is the Kerr effect coefficient, $f_B$ is the average optical frequency of the Brillouin waves, $\lambda_B$ is the vacuum wavelength of the Brillouin waves, and $n_B$ is the refractive index.

The Kerr effect coefficient $\eta$ determines the dependence of the Kerr-effect-induced bias on the power imbalance between the two Brillouin waves inside the cavity in accordance with Equation (4).

Active Power Control

Figure 2:
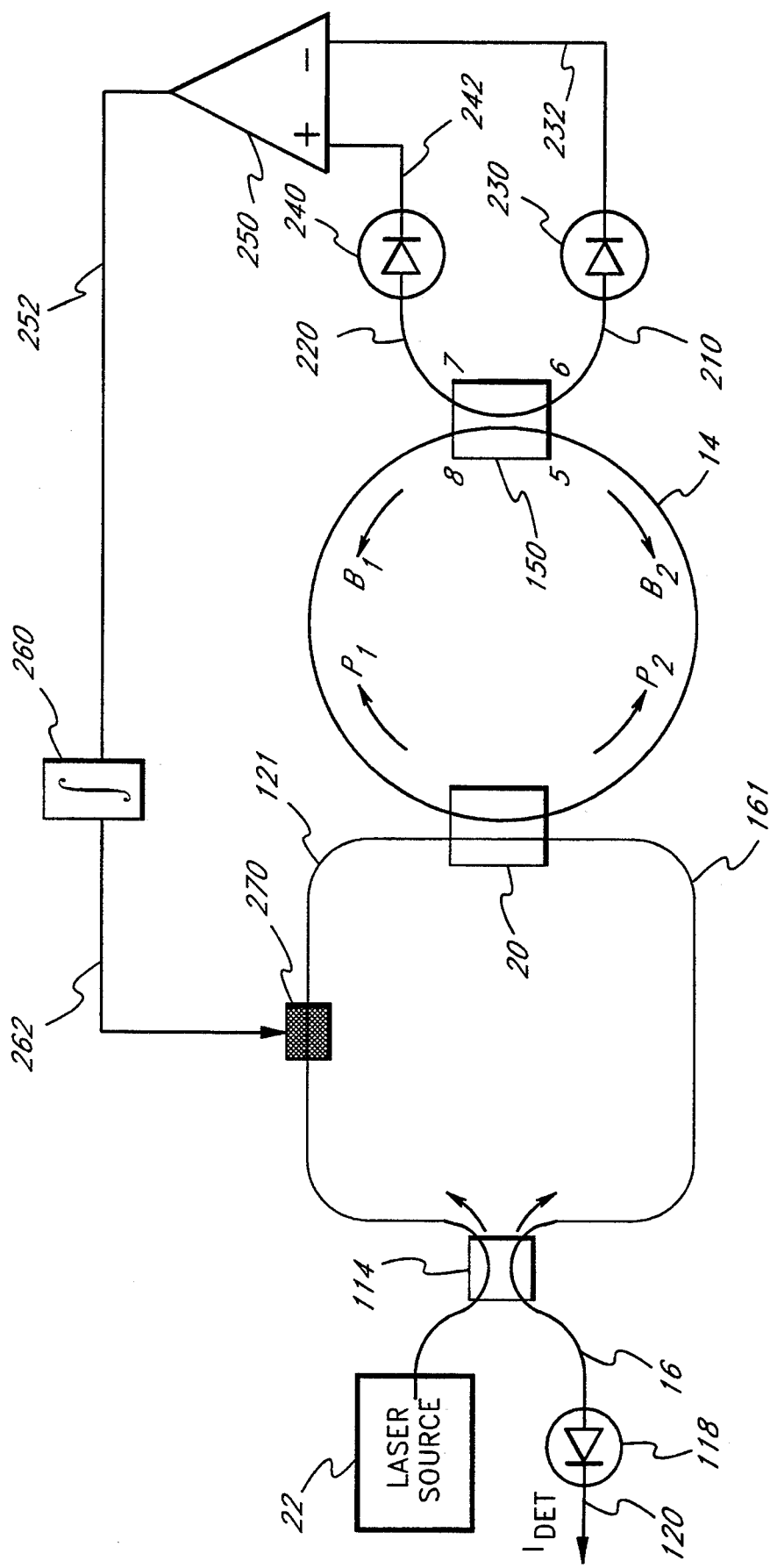
FIG. 2 illustrates the configuration of one aspect of the present invention, showing the feedback system for active power control.

The present invention illustrated in FIG. 2 utilizes a feedback system which monitors the difference between the circulating CW and CCW Brillouin intensities, and uses this difference in the form of a correction signal to control the CCW pump intensity through an intensity attenuator 270 coupled to fiber arm 121. The coupling constant of the coupler 114 is set slightly less than 50% so that the CCW pump power $P_2$ is higher than the CW pump power $P_1$ when the loss of attenuator 270 is minimum. The intensity attenuator 270 can be one of any conventional types; for example, a Mach-Zehnder interferometer with a phase modulator on one arm.

As illustrated in FIG. 2, one aspect of the present invention comprises a coupler 150 with a coupling constant of less than one percent, coupled to the resonant cavity loop 14. The coupler 150 has a pair of input/output ports 5 and 8 to which the loop fiber 14 is coupled, and has a pair of output ports 6 and 7. The fiber portions 210, 220 are optically coupled to photodetectors 230 and 240, respectively, which detect the optical power or intensity of the light coupled to the ports 6 and 7. The photodetectors 230 and 240 output electrical signals on signal lines 232 and 242, respectively, which signals are responsive to the detected intensity of the light from the ports 6 and 7. The signal lines 232 and 242 are connected to the inputs of a differential amplifier 250 which provides an output signal on a signal line 252 which is proportional to the difference between the detected intensity of the light from the ports 6 and 7. This correction signal from the differential amplifier 250 is integrated by an integrator 260 which provides an averaged output signal on a signal line 262. The averaged output signal is provided as an input to an intensity attenuator 270 which is coupled to the input end portion 12 of the optical fiber 10.

The fiber portions 210, 220 receive an amount of light proportional to the light propagating in the fiber loop 14 in the clockwise and counterclockwise directions, respectively. This light comprises both pump light and Brillouin light propagating in each direction. The coupler 150 is tuned to provide a coupling constant of less than one percent so that there is no significant reduction in the amount of light recirculating in the fiber loop 14. The differential amplifier 250 provides an output signal representing the difference in intensity levels between the combined light propagating in the counterclockwise direction and the clockwise direction in the fiber loop 14. The integrator 260 acts as a low pass filter for the correction signal generated by the differential amplifier 250 to filter out extraneous noise, fluctuations and random signals. As discussed below, the intensity attenuator 270 responds to the integrated correction signal to reduce the pump light introduced to the loop 14 in the counterclockwise direction to equalize the light in the clockwise and counterclockwise directions by providing an asymmetric feedback loop through the fiber arm 121. The polarity of the correction signal is selected so that when the differential amplifier detects a greater light intensity in the counterclockwise light waves, the attenuation of the attenuator 270 is increased to decrease the pump light through the fiber arm 121, and thus decrease the pump power introduced into the counterclockwise propagating pump light. Such a reduction in the counterclockwise propagating pump power is continued until the Brillouin light generated by the two counterpropagating pump waves are equal in magnitude and the corresponding correction signal is zero. Thus, when the correction signal is maintained as zero through the feedback loop, the circulating CW and CCW Brillouin intensities can be balanced. The circulating intensities can be expressed as:

$$P_{CW} = P_{P1} + P_{B2}$$

$$P_{CCW} = P_{P2} + P_{B1} \tag{5}$$

where $P_{cw}$ is the total CW intensity, $P_{P1}$ is the intensity of the clockwise pump light, $P_2$ is the intensity of the clockwise Brillouin light, $P_{CCW}$ is the total CCW intensity, $P_{P2}$ is the intensity of the counterclockwise pump light, and $P_{B1}$ is the intensity of the counterclockwise Brillouin light.

Rearranging Equation (5), it can be shown that:

$$P_{CW} - P_{CCW} = P_{B2} - P_{B1} + (P_{P1} - P_{P2}) \tag{6}$$

Figure 3:
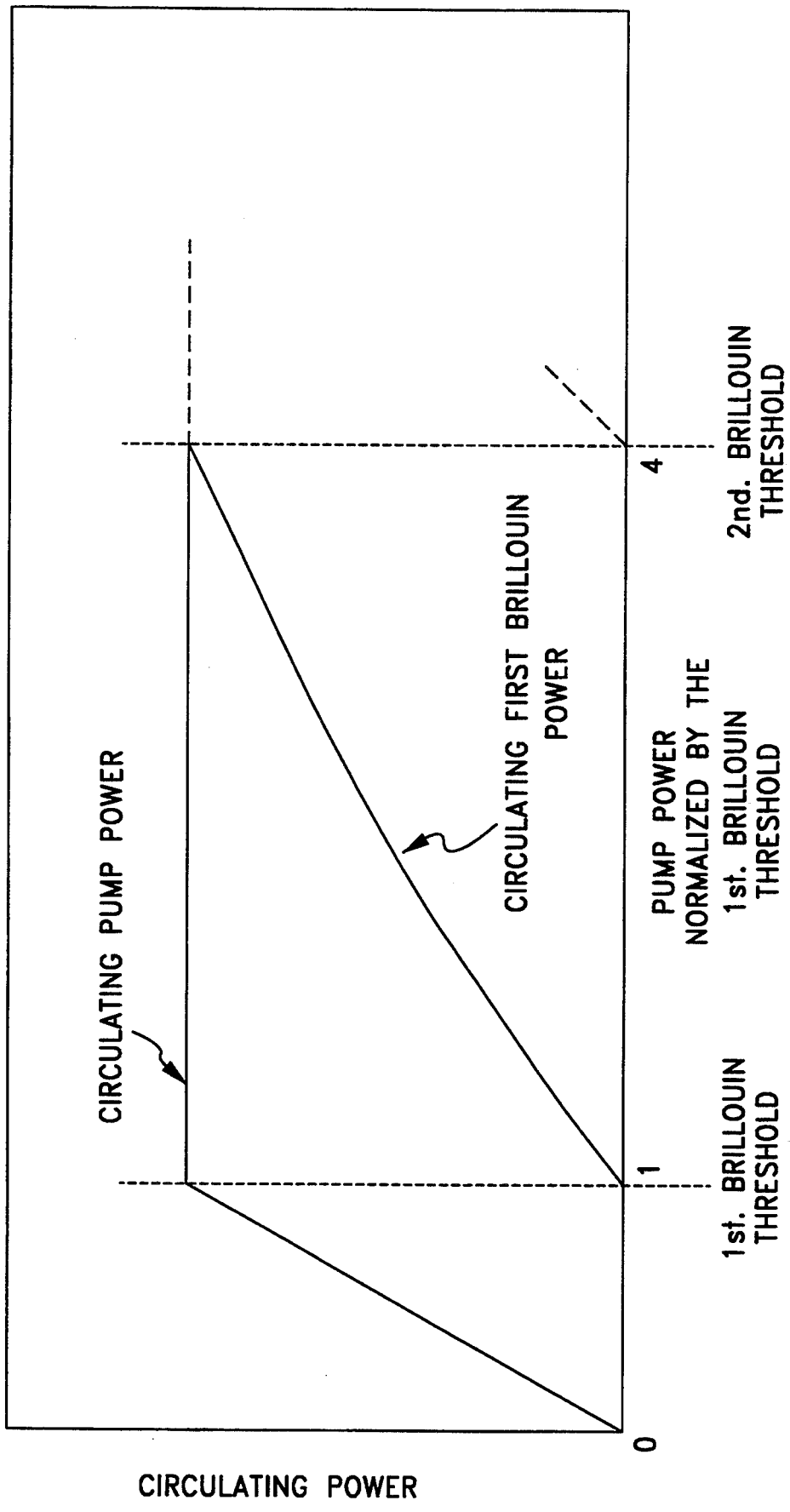
FIG. 3 is a graph of circulating pump power and Brillouin power versus pump input power in a resonant optical fiber loop.

As illustrated in FIG. 3, when the pump intensity reaches the first threshold for Brillouin scattering, the circulating pump power within the resonant cavity is pinned. Any additional pump input power above this pinned circulating pump power builds up as the first-order Brillouin circulating power. When this first-order Brillouin circulating power reaches the same level as the circulating pump power, which is also the threshold for the second-order Brillouin scattering, a second-order Brillouin circulating wave is generated. Thus, because the CW and CCW pump intensities are pinned and equal in the operating window between the first Brillouin threshold and the second Brillouin threshold, $P_{P1} = P_{P2}$, and any difference in the input pump power coupled from the fiber arm 121 and the fiber arm 161 results in a difference in the recirculating Brillouin power. Thus, a correction signal $\Delta P$ can be obtained as follows:

$$\Delta P = P_{CW} - P_{CCW} = P_{B2} - P_{B1} = \Delta P_B \tag{7}$$

By maintaining the correction signal $\Delta P$ at zero, the difference between the recirculating Brillouin waves is maintained at zero (i.e., $P_{B2} - P_{B1} = 0$). Thus $\Delta P_B 32\ 0$. Substituting this with Equation (3) provides $\Delta f_B = 0$ so that there is no measured offset due to differences in the pump power coupled into the fiber loop 14.

Thus, by controlling the intensity of the light introduced into the counterclockwise propagating pump signal, the recirculating clockwise and counterclockwise Brillouin intensities are balanced so that the problems of beat-frequency offset and the corresponding non-linear response can be significantly reduced or controlled.

Midpoint Stabilization

Another aspect of the present invention is the midpoint stabilization of the length of the cavity loop 14 for the two counterpropagating pump signals. The midpoint stabilization technique will be explained below in connection with FIGS. 10a, 10b, 10c, 12a, 12b and 13. However, in order to assist in understanding the invention, it is helpful to refer to FIGS. 4–9 which illustrate the technique used in resonant peak stabilization for typical BFOGs.

Figure 4A:
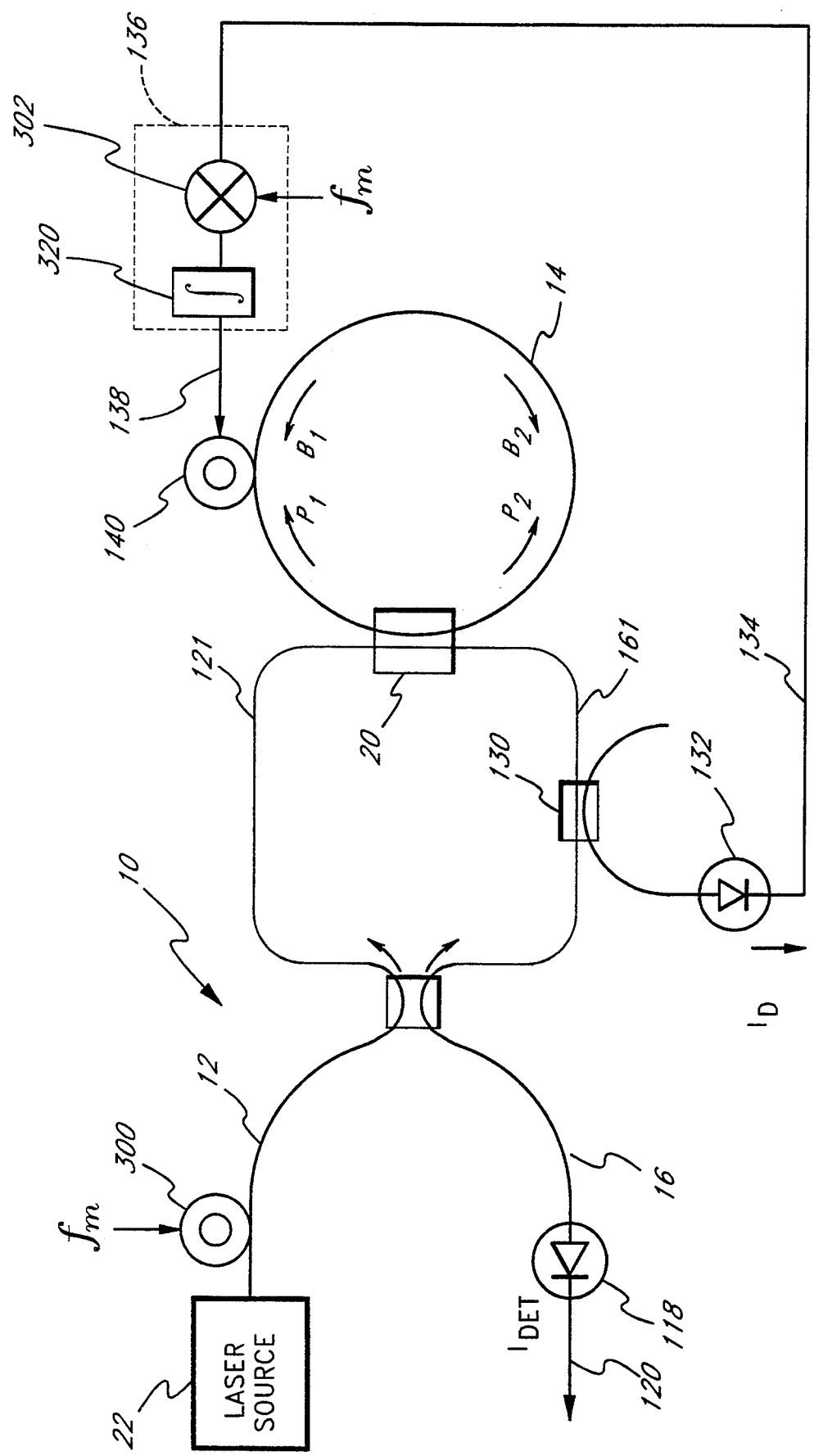
FIG. 4a depicts a BFOG configured for resonant peak stabilization through extracavity coupling and phase modulation at the laser source.
Figure 5A:
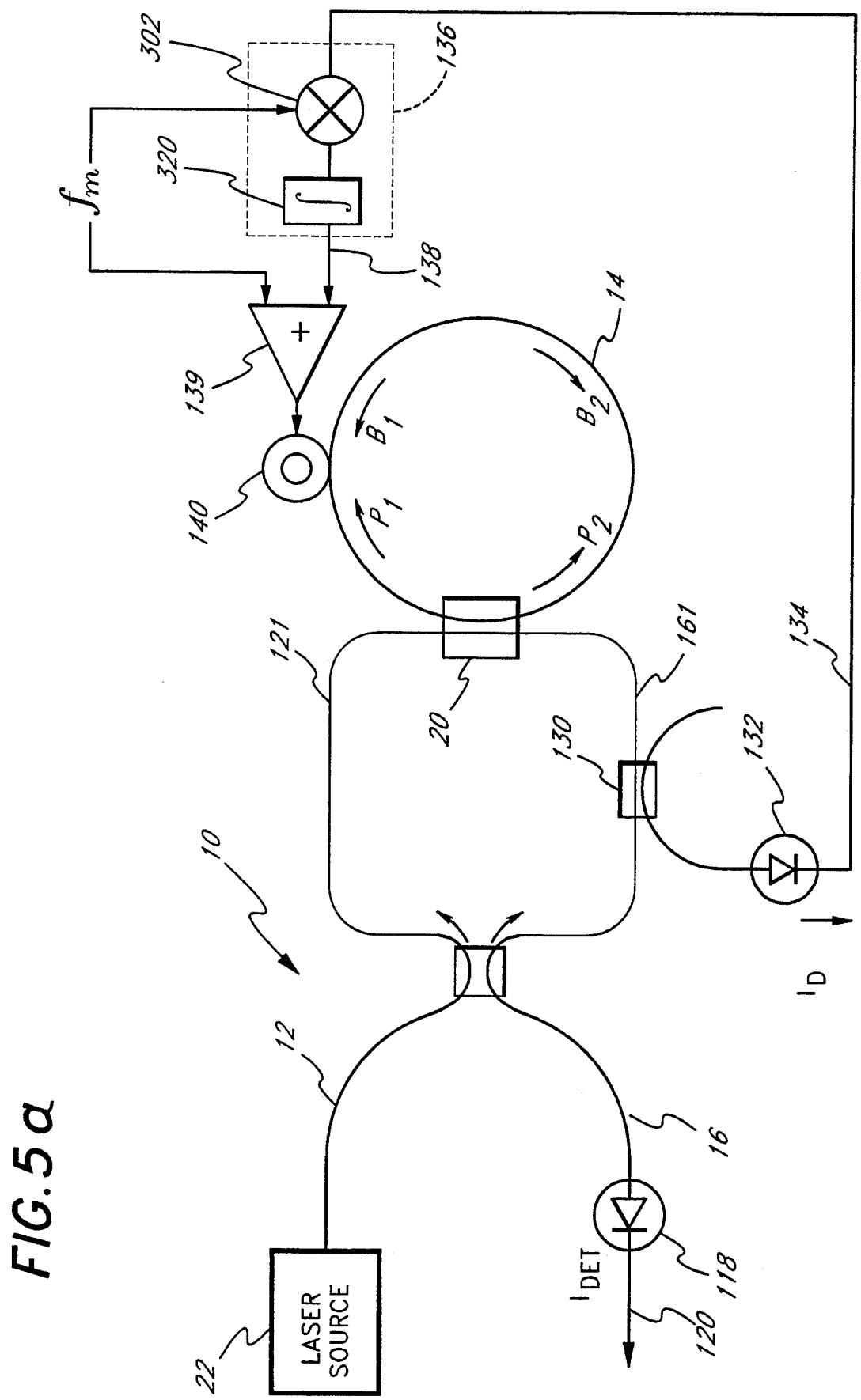
FIG. 5a depicts a BFOG configured for resonant peak stabilization through extracavity coupling and phase modulation within the resonant cavity.
Figure 5B:
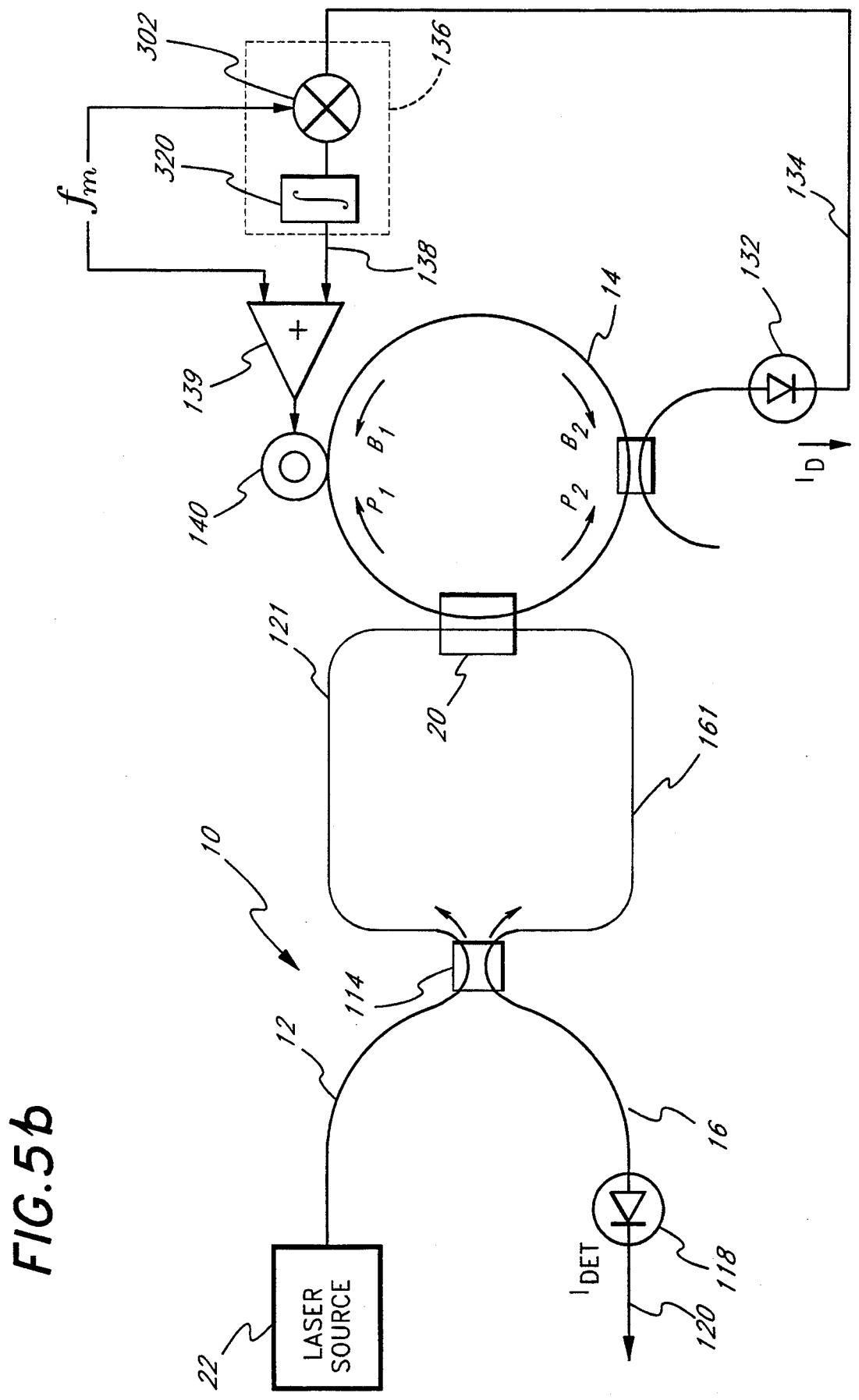
FIG. 5b depicts a BFOG configured for resonant peak stabilization through intracavity coupling and phase modulation within the resonant cavity.
Figure 6A:
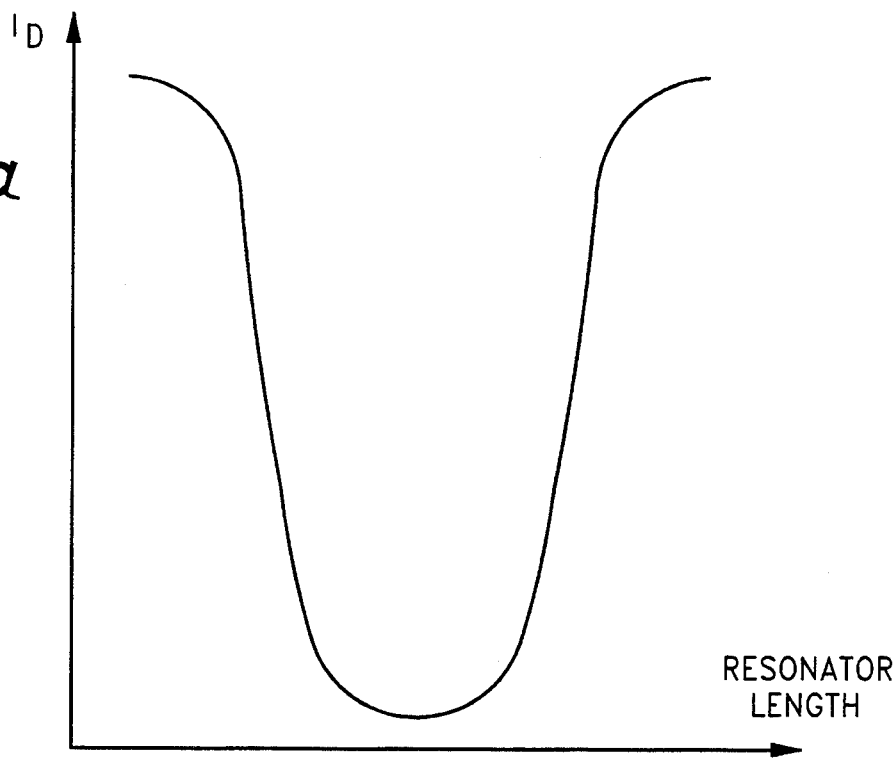
FIG. 6a is a response curve illustrating the relationship between the signal corresponding to the tapped intensity obtained from extracavity coupling, and resonator length.
Figure 6B:
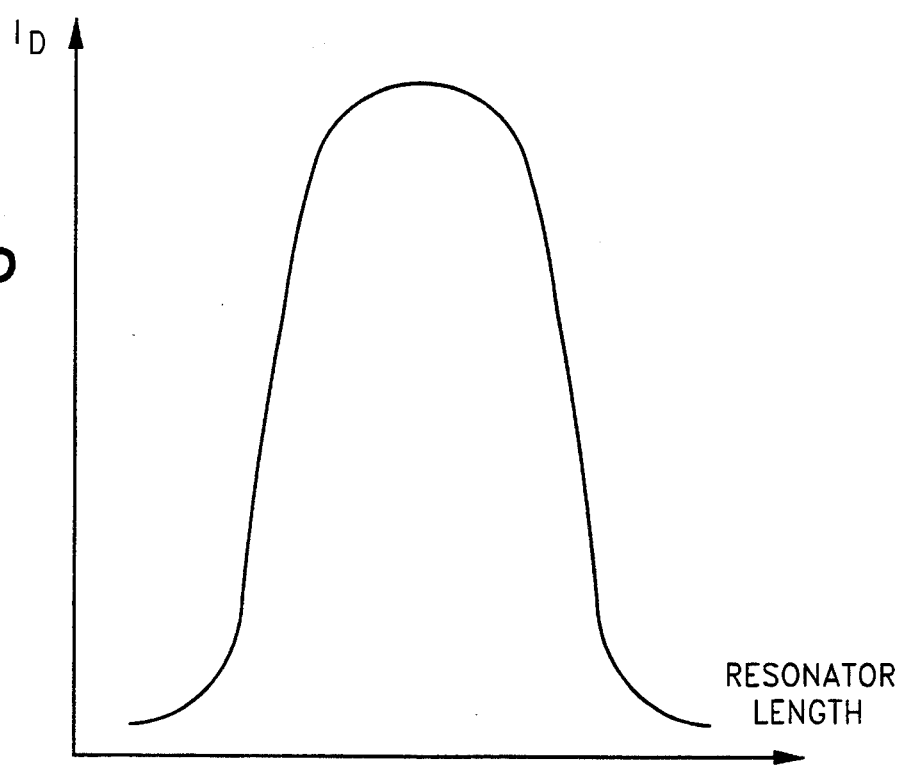
FIG. 6b is a response curve illustrating the relationship between the signal corresponding to the tapped intensity obtained from intracavity coupling, and resonator length.

In order to obtain an error signal for stabilizing the resonant cavity frequency at a selected value, a modulation and demodulation technique is used. Preferably, the pump light from the laser source 22 is passed through a phase modulator 300 to which a phase modulation signal having a frequency of $f_m$ is applied, as shown in FIGS. 4a and 4b. Alternatively, the intensity within the resonant cavity may be modulated at the frequency $f_m$, as illustrated in FIGS. 5a and 5b using a PZT cylinder 140. The phase modulator 300 advantageously comprises a PZT cylinder around which a length of the input end portion 12 of the optical fiber 10 is wrapped. The modulation signal causes the PZT cylinder to periodically expand and contract at the modulation frequency $f_m$, thus causing the length of the input end portion 12 to periodically vary, thereby causing a periodic change in the phase of the pump signal applied to the cavity loop 14. The phase modulator 300 has the effect of imposing a time-varying phase modulation onto the pump signal. Alternatively, the phase modulator 300 can be implemented on an integrated optics chip using LiNbO$_3$ or other suitable materials, as is well known in the art. If the laser source 22 has phase modulation capabilities, those can also be used for phase modulating the pump signal.

As illustrated in FIG. 4a, the coupler 130 on the fiber arm 161 taps a portion of the light that exits from the cavity loop 14. This light includes both pump light from the CCW circulating pump signal P2 and the Brillouin light from the CCW circulating Brillouin signal B1. The electrical signal generated by the photodetector 132 is responsive to the intensity of both light signals. A photodetector 132 outputs an electrical signal proportional to the intensity of the light signal in fiber arm 161.

Alternatively, as illustrated in FIG. 4b, the circulating intensity within the resonant cavity loop 14 may be tapped via a coupler 400. In both arrangements, the electrical signal on the line 134 is applied as one input to a lock-in amplifier 302 within the stabilization electronics 136. The other input to the lock-in amplifier 302 is the phase modulation signal having the frequency $f_m$. The lock-in amplifier 302 operates as a synchronous demodulator and provides an output signal responsive to the pump signal P2 circulating in the cavity loop 14. This output signal is used as an error signal to stabilize the resonant cavity frequency to a selected value.

When the laser source is phase modulated at frequency $f_m$, the spectrum of the light intensity obtained will consist of numerous side bands. With reference to FIG. 7a, where the phase modulation index is small, the carrier signal at frequency $f_o$ with an amplitude $J_o$ and two side bands at frequency $f_o \pm f_m$ with amplitude $J_1$ are dominant. The value of the sideband at $f_o + f_m$ is positive and that of the sideband at $f_o - f_m$ is negative.

The light throughput detected by the detector 132 in FIG. 4a or the circulating light detected by the detector 132 in FIG. 4b has a spectrum substantially similar to that shown in FIG. 7a, except for the change of amplitudes when the resonator is at resonance.

As shown in FIGS. 7b and 7b2 and FIGS. 7c1 and 7c2 upon detection by a photodetector, the combination of the carrier signal at frequency $f_o$ and the sideband at $f_o + f_m$ results in a frequency component $f_m$ in the detector current. Similarly, the combination of the carrier signal and the sideband at $f_o - f_m$ produces a frequency component $f_m$ in the detector current. These two electrical signals are however, opposite in phase and cancel each other out when the carrier signal is operating at resonance as shown in FIGS. 7c1 and 7c2.

Figure 7G:
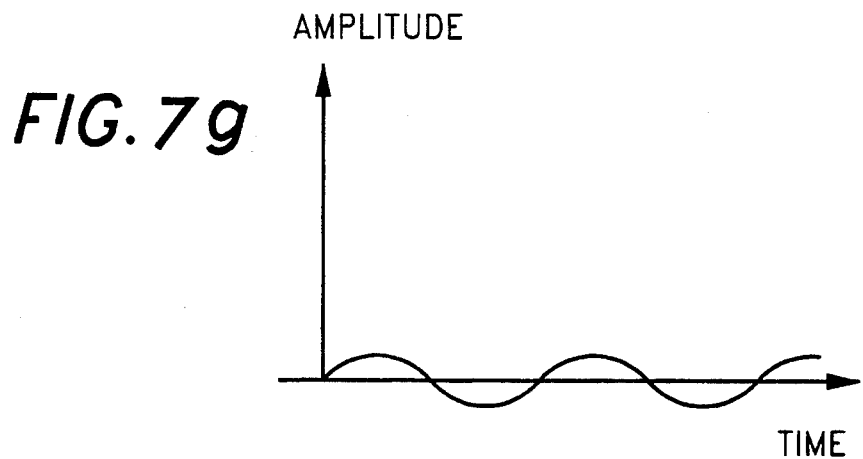
FIG. 7g illustrates the combination of the graphs of FIG. 7f.
Figure 7H:
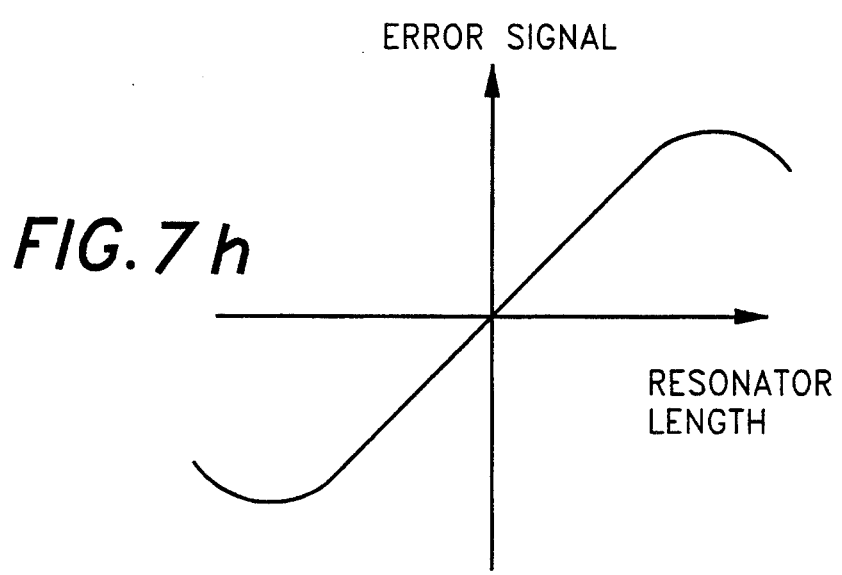
FIG. 7h illustrates an error signal obtained from combining the graphs of FIG. 7f.

When the resonator is detuned from resonance, the combination of the signals discussed above will no longer result in a complete cancellation. As shown in FIG. 7d, when the loop 14 is not at resonance, the carrier signal suffers a phase shift, the sign and magnitude of which depends respectively on the direction and the magnitude of detuning from resonance. As shown in FIGS. 7e1 and 7e2 and FIGS. 7f1 and the 7f2 combination of the beat frequency between the carrier signal, $f_o$, and that represented by the sideband at $f_o + f_m$, together with the beat frequency between the carrier signal, $f_o$, and that represented by the sideband at $f_o - f_m$ no longer cancels out because they are no longer opposite in phase. The resultant signal has an $f_m$ component, as shown in FIG. 7g. The error signal on the line 138 is obtained by measuring this $f_m$ component and converting it to DC voltage by the stabilization electronics 136. The relationship between this error signal and the change in the resonant cavity loop 14 length corresponding to the difference between the resonant frequency and the pump frequency is illustrated in FIG. 7h.

It can thus be observed that this error signal indicates the proximity of the tapped pump frequency to the resonant frequency of the cavity. As shown in FIG. 4a and 4b, this error signal is used in a feedback loop to adjust the length of the resonant cavity loop 14 to a preselected value.

As discussed above, the circulating intensity within the resonant cavity loop 14 may also be modulated to provide the error signal for use in a feedback loop. For this arrangement, the intensity may be tapped outside the resonant cavity loop 14, as shown in FIG. 5a or within the resonant cavity loop 14, as shown in FIG. 5b.

The circuit in FIG. 5a is identical to that shown in FIG. 4a, with two exceptions. First, the circuit in FIG. 5a does not require the use of the phase modulator 300 as shown in FIG. 4a. Second, the output of the stabilization electronics 136 is provided through signal line 138 as one input into an adder 139. The other input into the adder 139 is a modulation signal having a frequency $f_m$. The output of the adder 139 is then provided to a PZT cylinder 140.

Figure 8A:
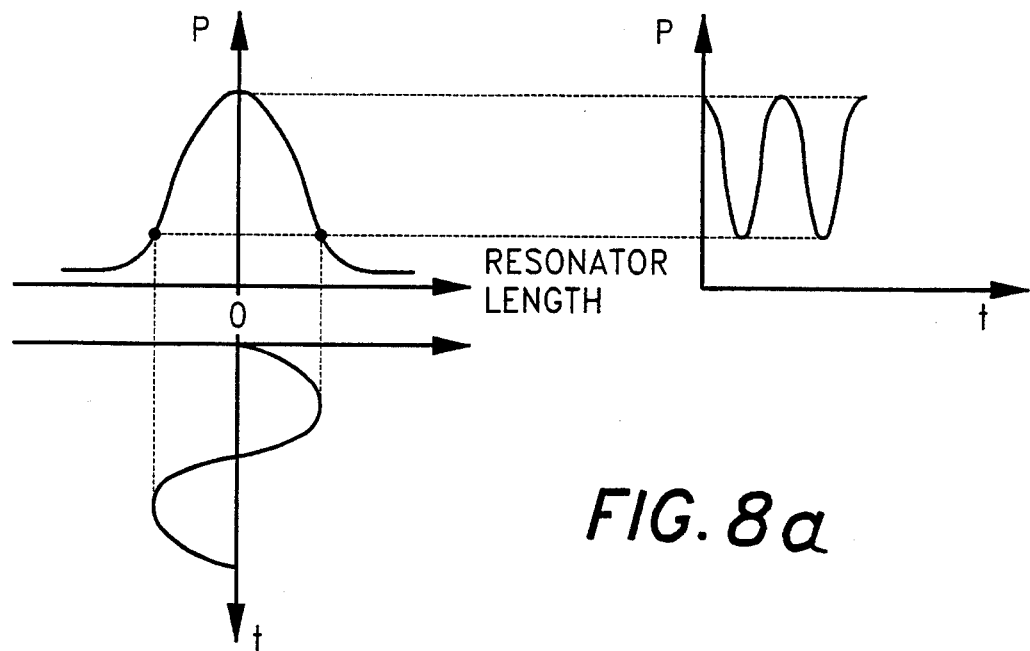
FIG. 8a illustrates the biasing modulation scheme and the resultant modulated signal when the resonant cavity is at rest.
Figure 8B:
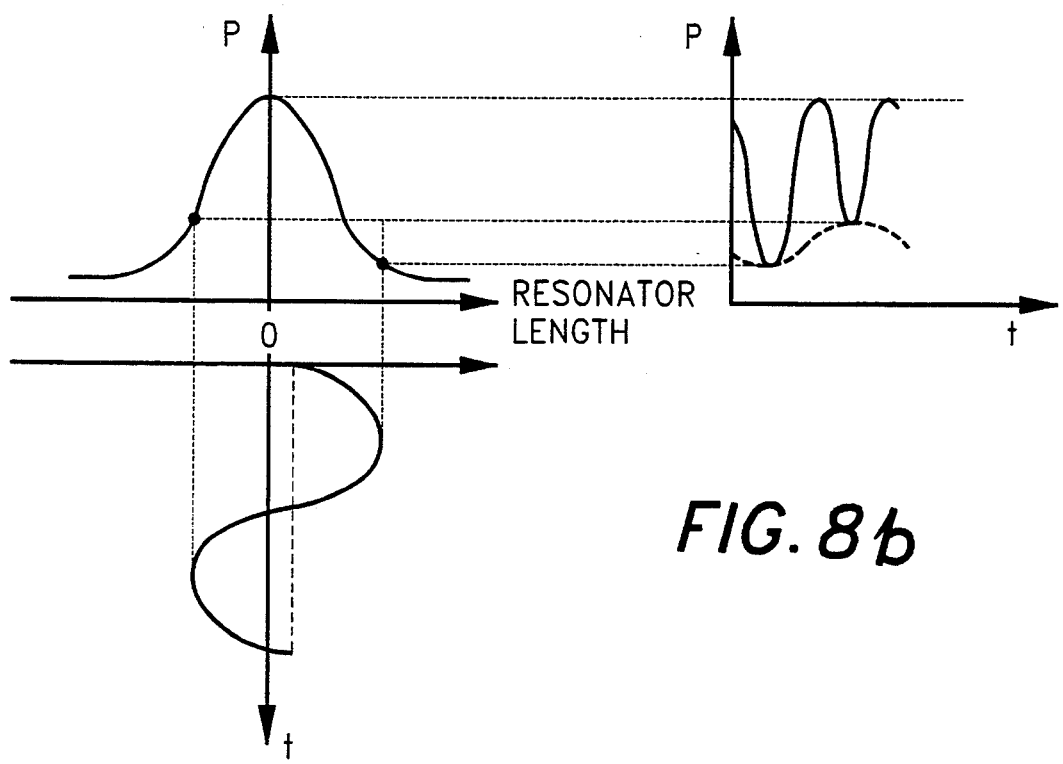
FIG. 8b illustrates the biasing modulation scheme and the resultant modulated signal when the resonant cavity is detuned from resonance.

When the operating point of the modulation for the arrangement in FIG. 5a is centered about the resonant frequency, there are only even harmonics of the fundamental frequency $f_m$ in the detector current, as shown in FIG. 8a. When the operating point shifts from resonance, odd harmonics appear, as shown in FIG. 8b. The detector current, which includes components of $f_m$, is detected by the photodetector. The lock-in amplifier detects the $f_m$ component and converts it to a DC voltage, which is used as an error signal in the same manner as described above.

Similarly, the circuit shown in FIG. 5b is identical to that shown in FIG. 4b, with the same exceptions listed above. First, the phase modulator 300 of FIG. 4b is not used in the circuit in FIG. 5b. Second, the output of the stabilization electronics 136 is provided via the signal line 138 as one input into an adder 139. The other input to the adder 139 is again a modulation signal having a frequency $f_m$.

Although it is possible to modulate the circulating intensities within the resonant cavity for cavity stabilization purposes, it is not the preferred method for two major reasons. First, when the circulating intensities within the resonant cavity are modulated, the response curves illustrated in FIGS. 8a and 8b are only true if the modulation occurs very slowly. If a high frequency is applied to modulate the circulating intensities, the corresponding response curves are no longer symmetric and cannot be applied to the feed back loop for cavity stabilization. Second, it is desirable to keep the circulating intensities within the resonant cavity intact and unperturbed due to design constraints. In particular, when the circulating intensities within the cavity are modulated at a high frequency or with a large amplitude, the efficiency of the circulating pump light decreases, leading to decreased Brillouin scattering. As a result, it is preferred to modulate the light at the laser source 22 for cavity stabilization purposes as shown in FIGS. 4a and 4b.

Figure 9A:
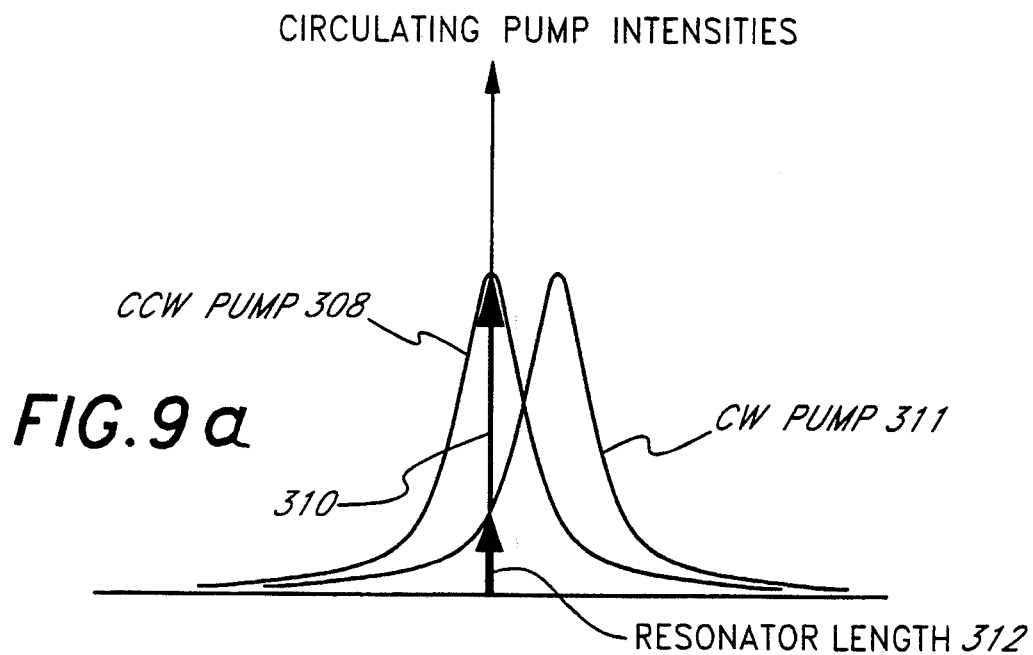
FIG. 9a illustrates the response curves of the counterpropagating pump signals with respect to resonator length within a rotating resonant cavity.

Resonant peak stabilization can be accomplished as follows. As discussed above, when the loop 14 is at rest, the two counterpropagating pump waves have the same resonant frequency. Once the loop 14 rotates, the resonant frequencies of the counterpropagating pump waves separate. This is illustrated, for example, in FIGS. 9a and 9b. FIG. 9a illustrates the relationship between the clockwise and counterclockwise propagating pump power signals in the cavity loop 14 and the length of the loop 14. A leftmost curve 308 in FIG. 9a represents the relationship of the magnitude of the counterclockwise propagating pump signal, P2 within the resonant cavity loop 14 and the length of the resonant cavity loop 14. As discussed above, when the cavity length is the resonant length of the pump signal, the circulating pump light and the incoming pump light constructively interfere to cause the pump light to build up in the cavity loop 14. Thus, as illustrated by the leftmost curve of FIG. 9a, the intensity of the pump signal in the loop 14 has its maximum intensity, as illustrated by a vector 310, because of the resonant condition. The resonator length corresponding to this resonant condition is known as the resonant length.

A rightmost curve 311 of FIG. 9a represents the magnitude of the clockwise propagating pump signal, P1, within the resonant cavity loop 14 under rotation. The separation of the two curves is proportional to the rotation rate. Under higher rotation rate, the clockwise propagating pump power P1 built up in the loop 14 will be substantially less than the pump power at resonance, as illustrated by a shorter intensity vector 312. In typical BFOGs, one of the circulating pump powers (in the present case, P2) is "stabilized" or "locked" to operate at the resonant peak value of the resonant cavity. When this occurs, the other counterpropagating pump light (in the present case, P1) must operate at a lower pump power level, i.e., that represented by vector 312 under rotation.

Figure 9B:
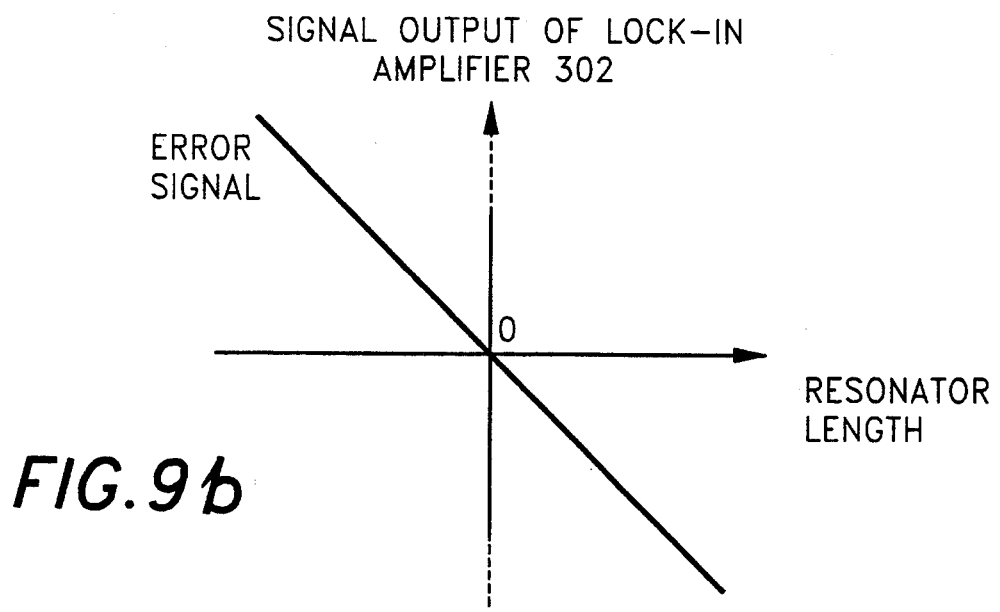

Stabilization of one of the circulating pump powers at resonant peak is accomplished as follows. FIG. 9b illustrates the error signal generated by the lock-in amplifier 302. The lock-in amplifier 302 detects both the amplitude and the phase of the detector current $I_{DET}$ on the line 134 in FIGS. 4a, 4b, 5a and 5b such that the error signal has a non-zero positive value when the cavity length is less than the resonant length (i.e., the resonant frequency of the cavity loop 14 is greater than the pump frequency) and such that the error signal has a non-zero negative value when the cavity length is greater than the resonant length.

The error signal output by the lock-in amplifier 302 is provided as an input to an integrator 320. The error signal is processed by the integrator 320 to filter out fluctuations, including high frequency signals (e.g., any residual signal at the modulation frequency $f_m$ and its harmonics, and any noise signals from the loop 14). The signal output from the integrator 320 drives the PZT cylinder 140 connected to the cavity loop 14 to expand or contract radially, thus stretching or contracting the fiber 14 to vary the fiber length so as to maintain the CW pump intensity at its resonant peak, as shown in FIG. 9a. In particular, for the examples of FIGS. 4a, 4b, 5a and 5b, when the error signal has a negative value indicating that the length of the loop 14 is less than the resonant length, thus indicating that the loop length is too long, the PZT cylinder 140 is contracted to cause the loop length to decrease toward the resonant length. In this way, the cavity loop 14 is maintained at the resonant length for the CCW propagating pump signal P2. Conversely, when the error signal has a positive value indicating that the length of the loop 14 is shorter than the resonant length, the PZT cylinder 140 is expanded to cause the loop length to increase toward the resonant length.

Alternatively, instead of adjusting the length of the cavity loop 14 by a PZT in FIGS. 4a, 4b, 5a, 5b, the frequency of the laser source 22 can be controlled by the error signal if the laser source has frequency-tuning capabilities. This may be preferred when the control of the frequency of the laser source is easier to implementing a PZT in the fiber loop 14.

The known BFOGs of FIGS. 4a, 4b, 5a and 5b are disadvantageous because while the stabilization circuit 136 is adjusting the length of the cavity loop 14 to be optimal for the CCW pump signal P2, it is effectively causing the length of the cavity loop 14 to become farther from the resonant length for the CW pump signal P1. For example, assume the cavity loop 14 is rotating in the counterclockwise direction to effectively cause the loop length to become longer for the CCW pump signal P2 and to become shorter for the CW pump signal P1. The stabilization circuits of FIGS. 4a, 4b, 5a and 5b counteract the effective lengthening of the loop seen by the CCW pump signal P2 by shortening the cavity loop 14, as discussed above. This also has the effect of shortening the cavity loop 14 for the CW pump signal P1, thus causing the length of the cavity loop 14 to vary even more from the resonant length for the CW pump signal P1. This has the effect of causing the CW pump signal P1 to quickly "walk-off" from its resonant peak, thus causing the intensity of the CW pump signal P1 to rapidly decrease. Thus, the corresponding intensity of the CCW Brillouin light B1 will decrease. This results in $P_{B2}$ being larger than $P_{B1}$ thus $\Delta P_B \neq 0$ and causing rotation-induced beat frequency offset $\Delta f_B$ according to Equation (3).

Figure 14A:
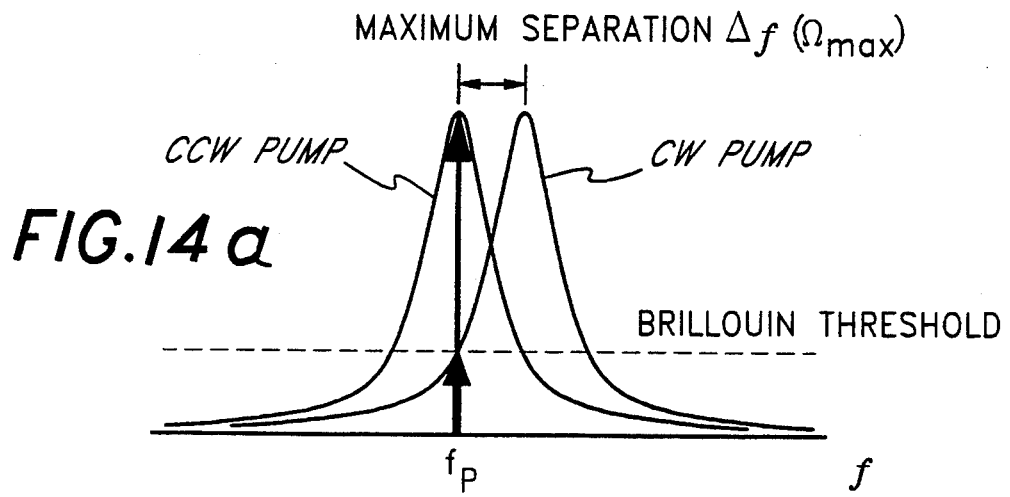
FIG. 14a illustrates the "walk-off" effect on the dynamic range of gyroscope rotation rate for BFOGs stabilized at the resonant peak of one of the counterpropagating signals.

Furthermore, as illustrated in FIG. 14a, with further rotation of the cavity loop 14, the intensity of the CW pump signal P1 will quickly decrease so that it is below the Brillouin threshold, such that the CCW Brillouin signal B1 is no longer generated. The range of rotation that the BFOG will measure before the intensity of the CW pump signal P1 is insufficient to support the generation of Brillouin light is referred to as the dynamic range. Further, it can be seen that as the intensity of the CW pump signal P1 is decreasing with respect to the intensity of the CCW pump signal P2, the intensity equalization circuit of FIG. 2 has to provide additional attenuation of the CCW pump signal P2, which decreases the CW Brillouin light signal B2.

FIGS. 10a, 10b, 10c, 12a, 12b and 13 illustrate embodiments of BFOGs in accordance with the present invention which solve the problem with the previous embodiment of FIGS. 4a, 4b, 5a and 5b. The embodiment of FIG. 10a includes the laser source 22 which provides light to the input end portion 12 of the optical fiber 10. The output end portion 16 is directed to the photodetector 118, as before. The phase modulator 300 is driven with the modulation signal at the frequency $f_m$. A coupler 400 is coupled to the cavity loop 14 and connected to photodetectors 332 and 342. The electrical outputs of the two photodetectors 332 and 342 are connected to signal lines 334 and 344, respectively. The signal lines 334 and 344 provide the outputs of the photodetectors 332 and 342 as inputs to lock-in amplifiers 361 and 362 respectively. A modulation signal $f_m$ is provided as another input to the lock-in amplifiers 361, 362. The outputs of lock-in amplifiers 361, 362 are then provided to integrators 371, 372 respectively. The outputs of the integrators 371, 372 are provided to an adder 350. The resultant signal from the adder 350 drives a PZT cylinder 380, which is coupled to the resonant cavity loop 14. The embodiment of FIG. 10a operates as discussed above to control the PZT cylinder 380 and thus control the length of the cavity loop 14; however, as discussed below, the length of the cavity loop 14 is not optimized for only one of the counterpropagating pump signals. Rather, the length of the cavity loop 14 is adjusted to maintain a balance between the intensities of the two pump signals. This reduces the power imbalance problem caused by the walk-off discussed above, and thus reduces the rotation-induced beat frequency offset.

Figure 10A:
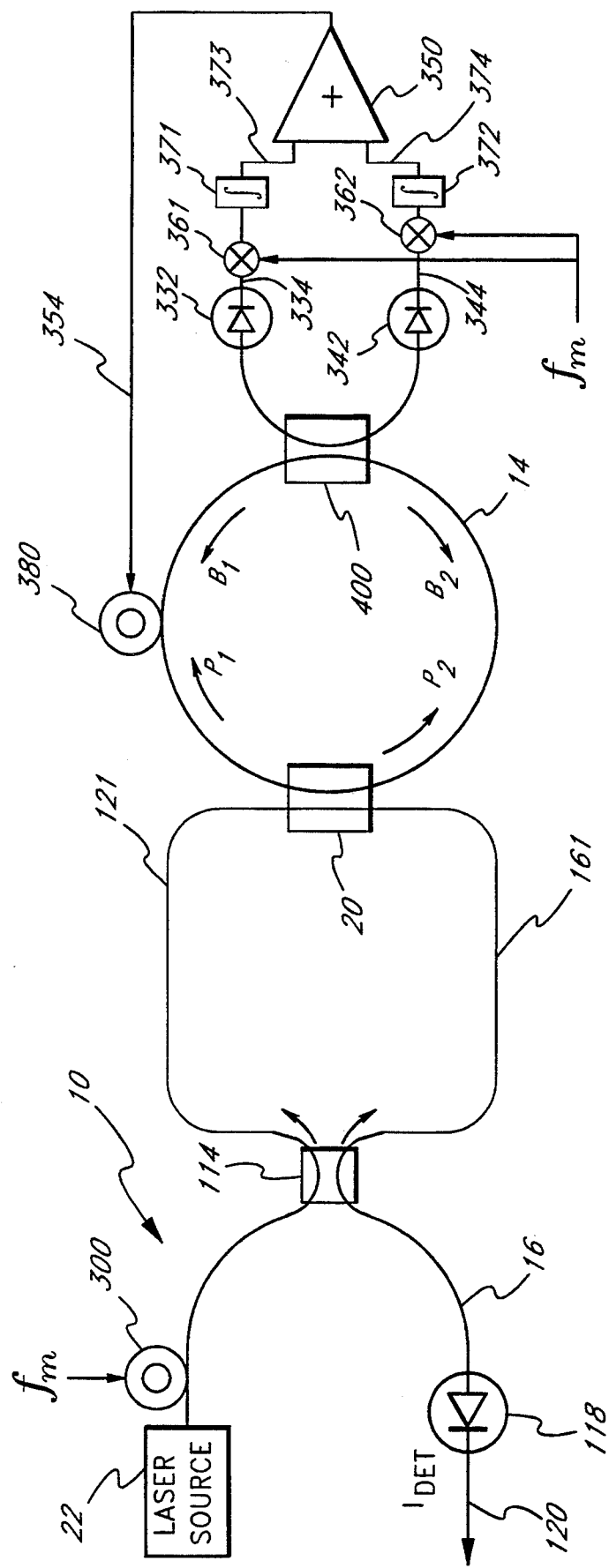
FIG. 10a illustrates one embodiment of one aspect of the present invention, showing the symmetric feedback system for midpoint stabilization, through intracavity coupling and phase modulation at the laser source.

The coupler 400 in FIG. 10a is advantageously identical to the coupler 400 of FIG. 4b. The coupler 400 is selected to provide a coupling constant of less than one percent so that only a small portion of the light intensities in the cavity loop 14 are tapped. This prevents any significant reduction in the light intensities being measured.

As shown in FIG. 10a, optical signals proportional to the CW and CCW circulating light intensities are tapped from the cavity loop 14 and coupled to the first and second photodetectors 332 and 342 by the coupler 400. The coupler 400 outputs two optical signals responsive to the CW pump signal P1 and CW Brillouin signal B2 to a first photodetector 342 and to output an optical signal responsive to the CCW pump signal P2 and the CCW Brillouin signal B1 to a second photodetector 332. The electrical signals generated by the photodetectors 332, 342 are provided as inputs to the lock-in amplifiers 361, 362 respectively. These signals are simultaneously demodulated at frequency $f_m$. The outputs of the lock-in amplifiers 361, 362 are then provided to integrators 371, 372 respectively. The outputs of the integrators 371, 372 provide the first and second error signals on signal lines 373 and 374, respectively. In particular, the first error signal on the signal line 374 is proportional to the detuning of the resonator seen by the CW pump P1, and the second error signal on the signal line 373 is proportional to the detuning of the resonator seen by the CCW pump P2. Finally, the adder 350 sums the first error signal and the second error signal, and provides a combined error signal on the line 354. This can be understood by referring to FIGS. 11a-11c.

Figure 11A:
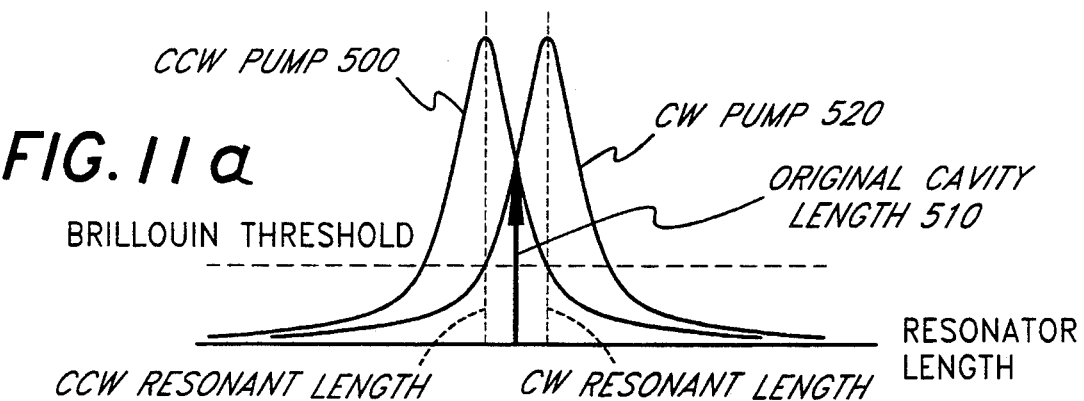
FIG. 11a illustrates the response curves of counterpropagating pump signals with respect to resonator length and a vector illustrating the midpoint stabilization scheme for the configurations shown in FIGS. 10b and 10c.

With reference to FIG. 11a, the resonant length of the CW and CCW pump signals within the cavity loop 14 separate when the cavity loop 14 rotates. For example, when the loop 14 rotates in the CCW direction, the CCW propagating pump light encounters a longer cavity length corresponding to a lower resonant frequency such that the resonant length of a resonant peak 500 of the CCW propagating pump light is shorter than an original cavity length 510. Similarly, the resonant length of a resonant peak 520 of the CW pump light is longer by a similar amount from the original length 510. As discussed above in connection with FIG. 4a, the prior stabilization circuit operated to maintain the cavity length at the resonant length for one of the pump signals (e.g., the CCW pump signal); however, this causes the other pump signal to operate further from its resonant peak, thus causing a substantial imbalance in the circulating pump intensities. The embodiment of FIG. 10a avoids this problem by operating upon error signals responsive to both the CW and CCW pump signals.

Figure 11B:
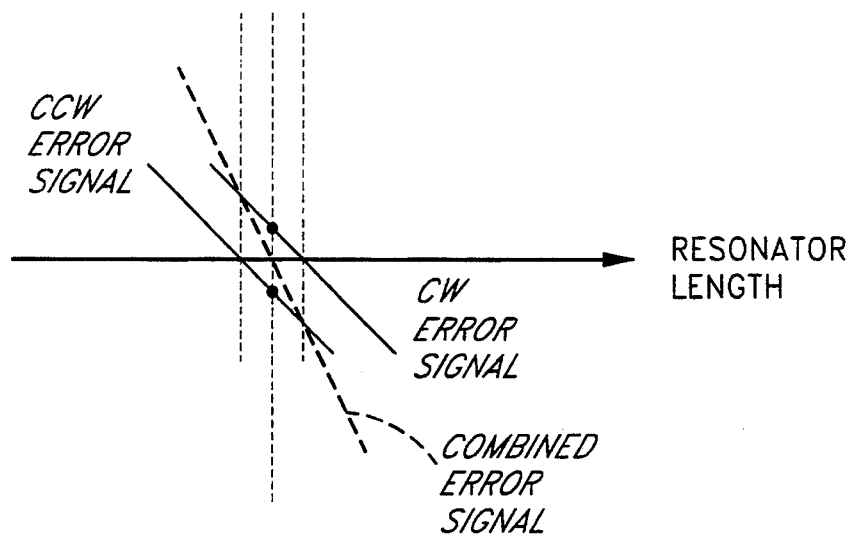
FIG. 11b illustrates the error signals corresponding to stabilization at each resonant peak for the two counterpropagating pump signals, and the signal obtained from the combination of these two error signals.

In the embodiment of FIG. 10a, the variations in intensities and phases are detected by the synchronous demodulation of the lock-in amplifiers 361 and 362. As illustrated in FIG. 11b, the CW pump signal which propagates in the direction having the shorter effective cavity length has an error signal caused by the resonator length being shorter than the resonant length of the CW wave. The magnitude of the CW error signal is responsive to the difference between the CW resonant length and the actual resonator length. That is, the further the CW resonant length is from the actual resonator length, the lower the intensity of the CW circulating pump signal is and the larger the CW error signal is. The sign (i.e., polarity) of the CW error signal is shown as positive for the original cavity length because the original cavity length is shorter than the CW resonant length. On the other hand, the CCW error signal is shown as negative because the original cavity length is longer than the CCW resonant length. Again, the further the CCW resonant length is from the actual resonator length, the lower the CCW pump intensity is and the larger the CCW error signal is.

Figure 11C:
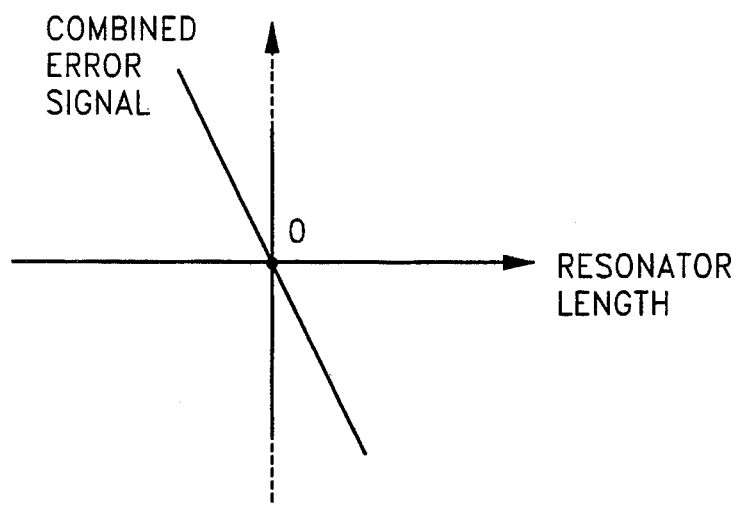
FIG. 11c illustrates the combination of the two error signals shown in FIG. 11b.

Assuming the cavity length is balanced so that both the CW pump signal and the CCW pump signal are off resonance by substantially the same frequency difference, the two error signals will have substantially the same magnitude but opposite signs. Thus, as illustrated in FIG. 11c, the combined error signal, caused by adding the two error signals, has a magnitude substantially equal to zero when the two resonant cavity frequencies have substantially the same frequency difference from the pump frequency. If, however, the magnitude of one error signal is greater than the magnitude of the other error signal, the resulting combined error signal will have a non-zero value. For example, if the CW resonant length is further from the actual resonator length than the CCW resonant length, then the error signal will have a combined positive value, as indicated by going left from the zero value in FIG. 11c. This could occur through either the drift of laser source frequency or a change in the length of resonator loop 14 caused by temperature fluctuations.

The resulting positive value is applied to the PZT cylinder 380 to cause the PZT cylinder 380 to expand. The expansion of the PZT cylinder 380 increases the cavity length for the CW pump wave, thus reducing the difference between the CW resonant length and the cavity length. On the other hand, the difference between the CCW resonant length and the cavity length becomes greater so that the two differences balance to bring the combined error signal back to a substantially zero value. Furthermore, if the rotation is in the opposite direction (i.e., CW), the roles of the CW pump signal and the CCW pump signal are reversed in FIGS. 11a-11c; however, the combined error signal still operates to maintain the effective CW cavity length and the effective CCW cavity length at values such that the two resonant cavity frequencies have the same frequency difference from the pump frequency. That is, this aspect of the present invention operates to provide midpoint stabilization of the resonant cavity length so that the resonant frequency of the cavity seen by the two pump signals is displaced from the frequency of the pump signal by a frequency difference such that both pump signals have substantially equal circulating pump intensities and are thus balanced, regardless of the rate and the direction of rotation. As a result, both the CW and CCW Brillouin signals receive the same gain, and therefore have substantially the same intensities.

Figure 10B:
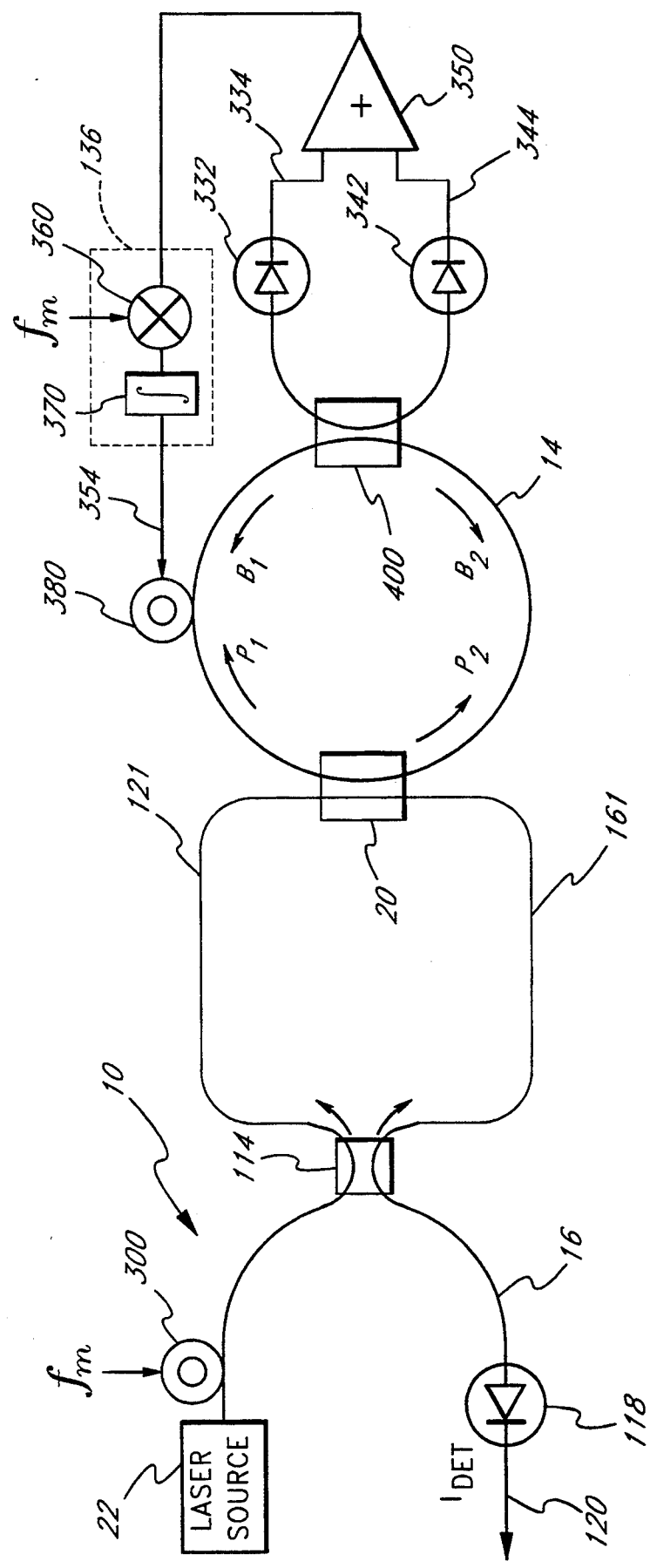
FIG. 10b illustrates another embodiment of one aspect of the present invention, showing the symmetric feedback system for midpoint stabilization, through intracavity coupling and phase modulation at the laser source.

FIG. 10b illustrates another embodiment of the present invention. This embodiment is identical to that in FIG. 10a, with the exception that the electrical signals generated by the photodetectors 332, 342 are provided as inputs to the adder 350. The output of the adder 350 is first provided to a lock-in amplifier 360 and then to an integrator 370, which operate as in FIG. 10a to control the length of the cavity loop 14 in the same manner. The embodiment in FIG. 10b is advantageous in that it performs the same function as the embodiment in FIG. 10a, but requires fewer electrical components, resulting in decreased error.

Figure 10C:
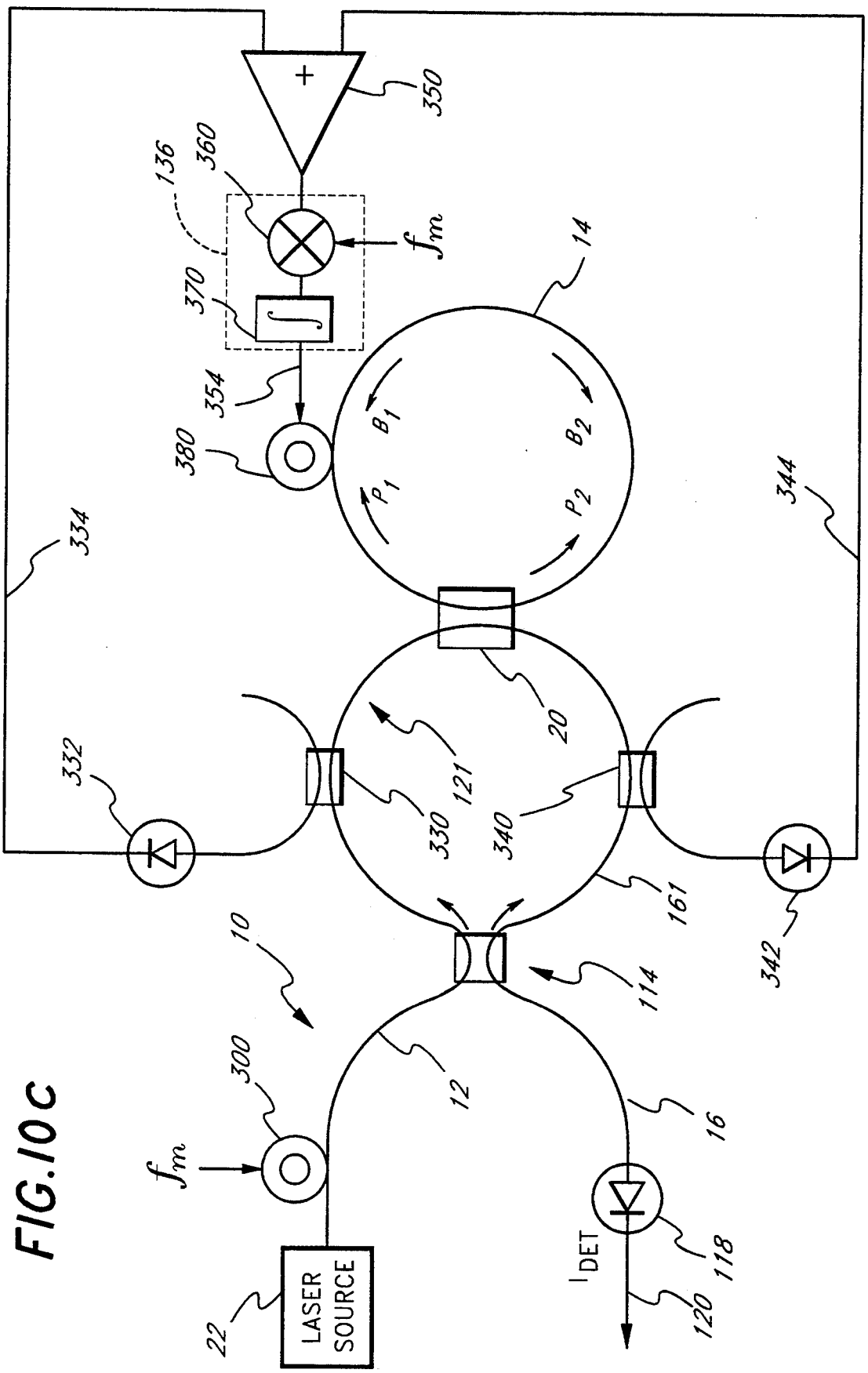
FIG. 10c illustrates one embodiment of one aspect of the present invention, showing the symmetric feedback system for midpoint stabilization, through extracavity coupling and phase modulation at the laser source.

In another embodiment of this aspect of the present invention illustrated in FIG. 10c, couplers 330, 340 are coupled to the fiber arms 121, 161 respectively. The coupler 340 is advantageously identical to the coupler 130 in FIG. 5a. The couplers 330, 340 in FIG. 10c output optical signals coupled from the fiber arms 121, 161 through photodetectors 332, 342 respectively and provide these signals via signal lines 334, 344 to an adder 350. The sum output of the adder 350 is provided to a lock-in amplifier 360. The output of the lock-in amplifier 360 is identical to the lock-in amplifiers 361, 362 shown in FIG. 10a. Similarly, the integrator 370 is identical to the integrators 371, 372 shown in FIG. 10a. The output of the integrator 370 operate as before to drive the PZT cylinder 380 to control the length of the cavity loop 14, and thereby equalize the cavity loop 14 as described above for FIGS. 10a and 10b.

Figure 12A:
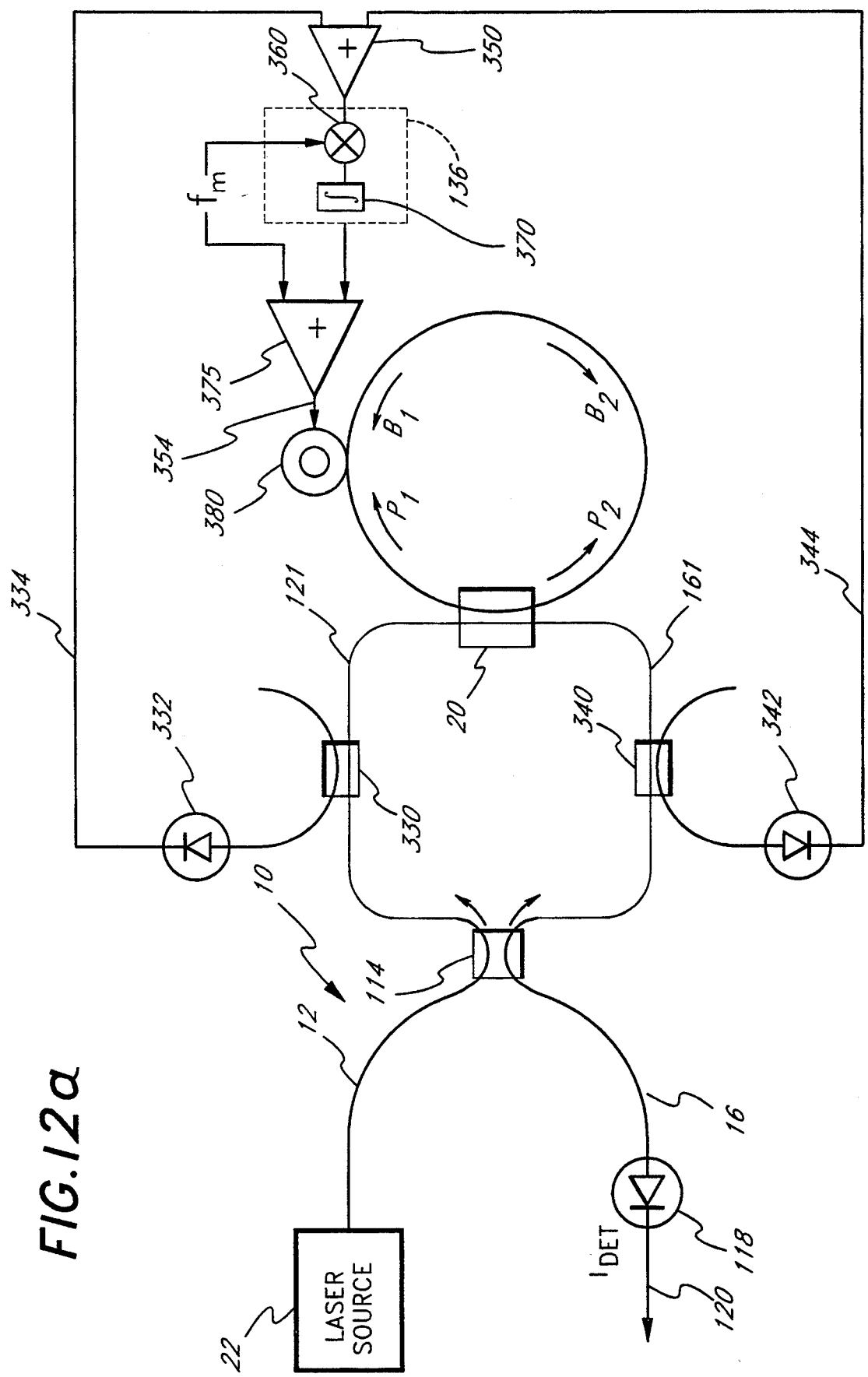
FIG. 12a illustrates one embodiment of one aspect of the present invention, showing a symmetric feedback system for midpoint stabilization through extracavity coupling and phase modulation within the resonant cavity.
Figure 12B:
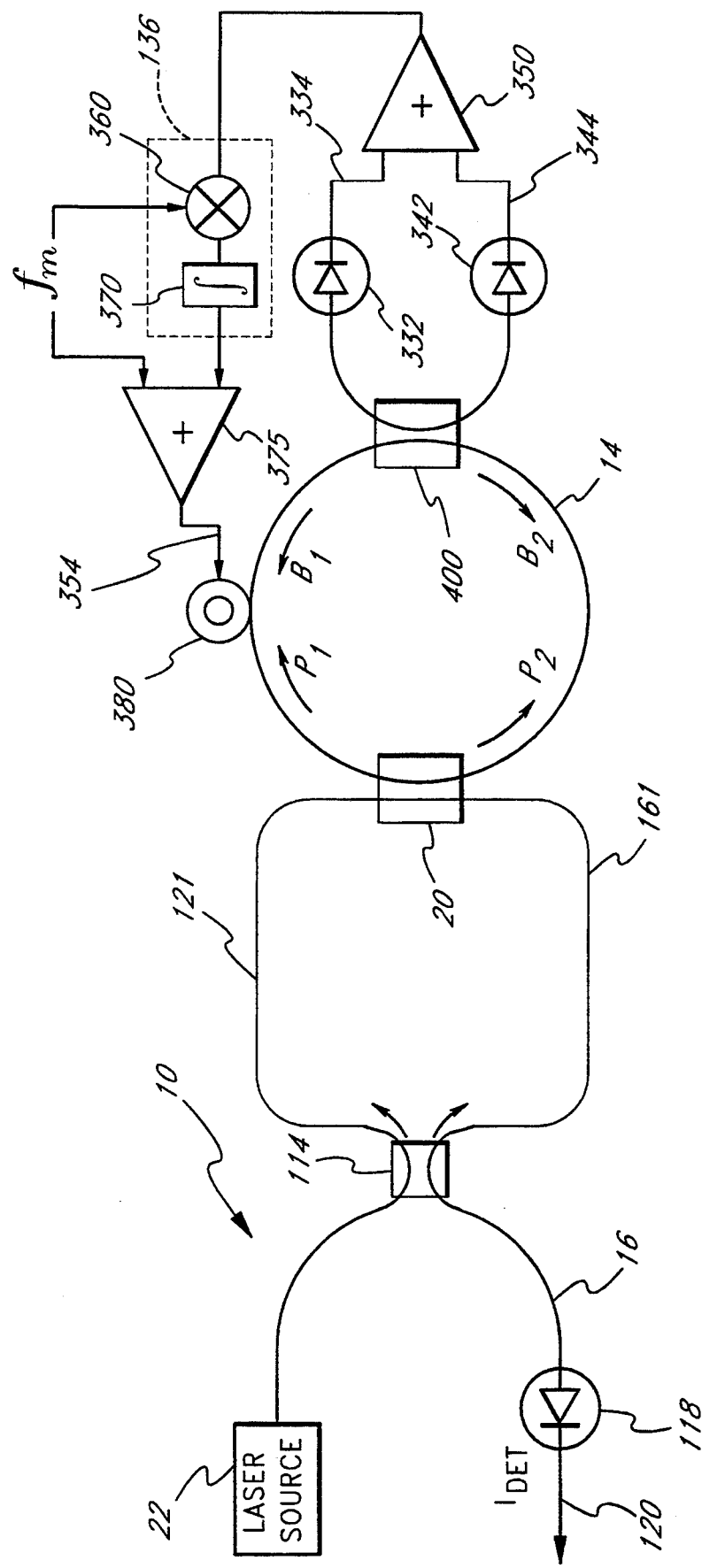
FIG. 12b illustrates one embodiment of one aspect of the present invention, showing a symmetric feedback system for midpoint stabilization through intracavity coupling and phase modulation within the resonant cavity.

In another embodiment of the present invention, as illustrated in FIGS. 12a and 12b, modulation is applied intracavity, instead of at the output of the laser source 22, as shown in FIGS. 10a, 10b and 10c. The embodiment illustrated in FIG. 12a is identical to that shown in FIG. 10c, with two exceptions. First, the phase modulator 300 shown in FIG. 10c is not used in FIG. 12a. Second, the output of the integrator 370 in FIG. 12a is provided as one input into an adder 375. The other input to the adder 375 is a modulation signal $f_m$. The output of the adder 375 is then provided into the PZT 380, which operates as discussed above.

The embodiment illustrated in FIG. 12b is similarly identical to the embodiment shown in FIG. 10b, with the same exceptions pertaining to FIG. 12a. The phase modulator 300 present in FIG. 10b is not used in FIG. 12b. In addition, the output of integrator 370 is again provided as one input into an adder 375. The other input of the adder 375 is again a modulation signal $f_m$. The output of the adder 375 is similarly provided to the PZT cylinder 380, which operates as discussed above.

Although the intracavity phase modulation technique used in FIGS. 12a and 12b are feasible, they are limited in application, since the modulation signal $f_m$ applied to these embodiments must be slow for the reasons discussed earlier.

Figure 13:
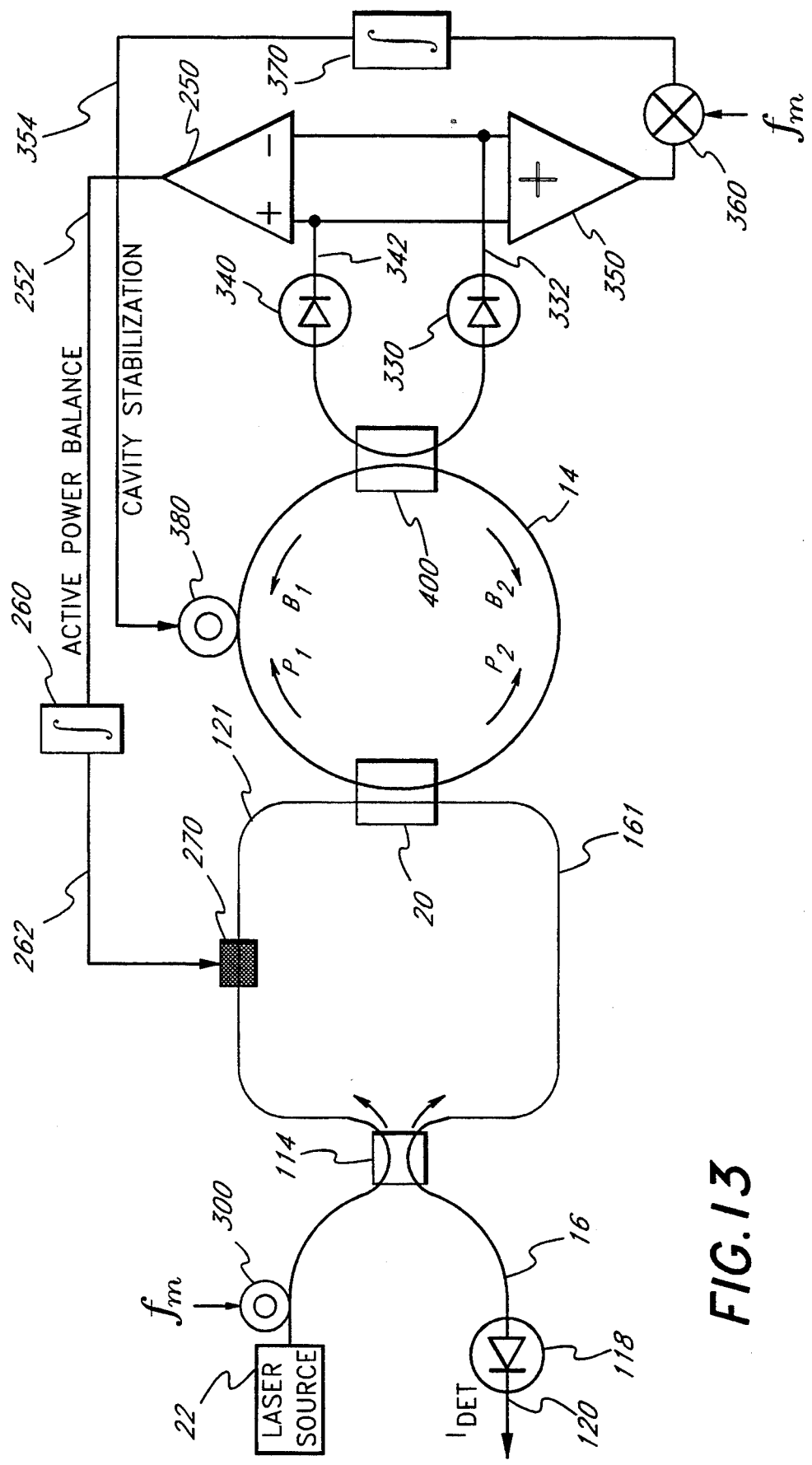
FIG. 13 illustrates one embodiment of the present invention incorporating both active power control and midpoint stabilization into one BFOG system.

FIG. 13 illustrates a further embodiment of the present invention in which the Active Power Control embodiment of FIG. 2 and the Midpoint Stabilization embodiment of FIG. 10b are combined into a single BFOG system. Although the embodiments of FIGS. 2 and 10b could be readily combined, the embodiment of FIG. 13 combines the embodiments of FIGS. 2 and 10b so that only the single coupler 400 and only one pair of photodetectors 330, 340 are required to implement the two aspects of the invention. As discussed above, the coupler 400 taps the circulating CW and CCW intensities required and provides these intensities to the circuitry to simultaneously achieve power balance in the fiber arms 121, 161 and to provide cavity stabilization in the cavity loop 14.

The pump intensities sampled through coupler 400 of FIG. 13 are combined, demodulated, integrated and fed back to the resonator for error correction in accordance with FIG. 10b. At the same time, the difference in the sampled intensities may be monitored, integrated and fed back to the selective attenuator 270 so that any power source imbalance may be corrected. In addition, by tapping the circulating light signals only a single time, the losses associated with such tapping are reduced.

As briefly discussed above, the present invention increases the dynamic range of the BFOG by reducing the "resonant walk-off effect." The pump waves in a BFOG can resonate in the cavity only if the pump frequency falls within the resonance frequency of the cavity loop 14. Upon rotation of the loop 14 about an axis perpendicular to its plane, the resonant frequency of one of the pump waves is upshifted, and the resonant frequency of the other pump wave is downshifted.

The pump frequency is fixed by the frequency of the laser source 22. Thus, the shift in the resonant frequency caused by the loop rotation does not change the pump frequency; however, the intensities of the recirculating pump signals are reduced by the mismatch between the pump frequencies and the resonant frequency of the cavity loop 14 caused by the Sagnac effect. Generally, prior to the present invention, the resonant cavity length is maintained at the resonant frequency $f_P$ of one of the counterpropagating pump waves.

As described earlier, the "resonant walk-off effect" restricts the dynamic range of the gyro. The pump waves in a BFOG can resonate in the cavity only if the pump frequency falls within the resonance frequency peak. Referring to FIG. 14a, if the resonant length of the cavity continues to be maintained at the resonant frequency $f_P$ of one of counterpropagating waves as in the prior embodiment of FIG. 4a, the intensity of the other counterpropagating wave at the resonant frequency will diminish such that it is below the Brillouin threshold intensity, and the pump power in that wave will no longer be sufficient to cause the generation of Brillouin laser light. The maximum rotation rate that can be detected before this occurs is referred to as $\Omega_{max}$, and the separation frequency is shown in FIG. 14a as $\Delta f(\Omega_{max})$.

There are multiple thresholds for different orders of Brillouin lasing in a BFOG. When the pump intensity reaches the first threshold for Brillouin stimulated scattering, the circulating pump power within the resonant cavity is pinned. Any additional pump input power above this pinned level is built up as the first-order Brillouin circulating power.

When the first circulating Brillouin power reaches the same level as the circulating pump power, which is also the threshold for the second order Brillouin scattering, the second-order Brillouin circulating wave is generated. The operating window between the first-order Brillouin threshold and the second-order Brillouin threshold is referred to as the first operating window of the BFOG.

When the gyroscope is operating at the maximum limit of the first window, i.e., when the input pump power is just below the second-order Brillouin threshold, and when asymmetrical stabilization is employed, as illustrated in FIG. 1, the maximum allowed separation of resonator mode frequencies seen by the CW and CCW traveling waves is $\pm[(\sqrt{3})(\Delta f_c/2)]$, where $\Delta f_c$ is the full width at half maximum of the resonant peak (i.e., FWHM). This maximum allowed separation, illustrated in FIG. 14a, occurs where the CW pump is stabilized at resonant peak and the corresponding CCW pump is operating at the threshold for Brillouin scattering, which is 0.25 of the CCW pump intensity, as shown in FIG. 3.

The maximum rotation rate of the BFOG, corresponding to the frequency range of $-[(\sqrt{3})(\Delta f_c/2)]$ and $+[(\sqrt{3})(\Delta f_c/2)]$ is:

$$\Omega_{MAX} = (\sqrt{3}/2)(\Delta f_c/S) \qquad (8)$$

where S is the scale factor. This maximum rotation rate in prior BFOGs is obtained by stabilizing one of the pump intensities at resonant peak.

Figure 14B:
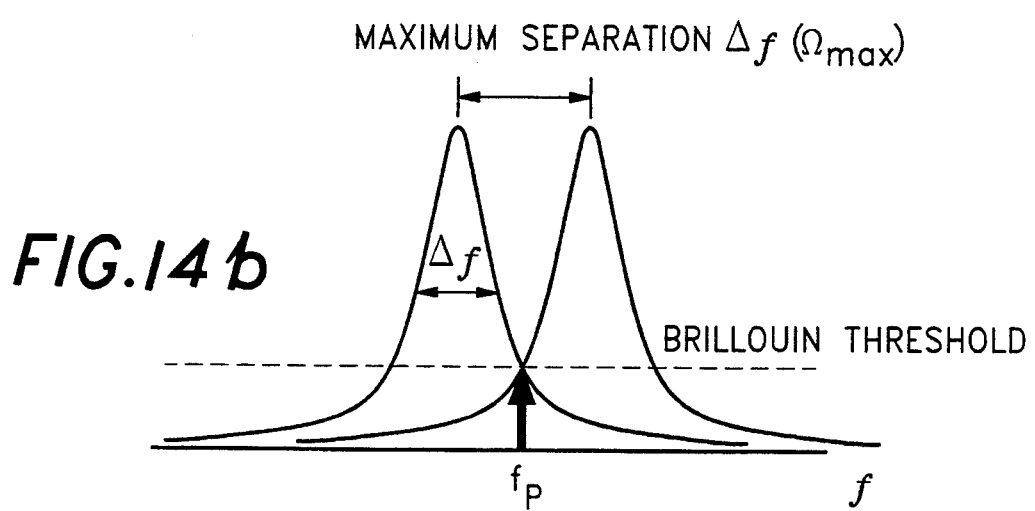
FIG. 14b illustrates the increased maximum separation in the dynamic range of FIG. 14a with the present invention of midpoint stabilization.

With the present invention of midpoint stabilization, the signal is locked at midpoint between the CW and CCW resonant mode peaks, as shown in FIG. 14b. By doing so, the BFOG of FIGS. 10a, 10b, 10c, 12a, 12b and 13 will continue to operate until both recirculating pump signals are below the Brillouin threshold intensity. That is, the BFOG will continue to operate until both recirculating pump intensities while rotating are below one-quarter of the peak pump power that occurs when the BFOG is not rotating. This permits a wider separation between the CW and CCW resonant modes in sustaining the Brillouin signals. Since the resonant mode peaks have Laurentzian lineshapes, the corresponding improvement obtained through the present invention is twice or a 100% increase in the dynamic range of existing BFOGs (FIG. 14a). Therefore, with the present invention of midpoint stabilization, the maximum rotation rate of the improved BFOG becomes:

$$\Omega_{max} = \sqrt{3}\,(\Delta f_c/S) \qquad (9)$$

Although this invention has been described in terms of a certain preferred embodiment, other embodiments apparent to those of ordinary skill in the art are also within the scope of this invention. Accordingly, the scope of the invention is intended to be limited by the following appended claims.

What is claimed is:

1. An apparatus for controlling the clockwise and counterclockwise circulating Brillouin intensities in a Brillouin fiber optic gyroscope, comprising:
   means for detecting a difference between said clockwise circulating Brillouin intensity and said counterclockwise circulating Brillouin intensity; and
   means responsive to said difference for controlling said clockwise and counterclockwise circulating Brillouin intensities.

2. An apparatus for controlling the difference between counterpropagating Brillouin intensities in a Brillouin fiber optic gyroscope responsive to counterpropagating pump signals in a cavity, comprising:
   a coupler that taps light from said cavity;
   a first detector that detects a portion of the circulating Brillouin intensities traveling in a first direction in said cavity;
   a second detector that detects a portion of the circulating Brillouin intensities traveling in a second direction in said cavity;
   a differential amplifier that provides an output signal responsive to a difference in intensities detected by said first and second detectors;
   an integrator that integrates the output signal from said differential amplifier and provides an integrated output signal; and
   an intensity attenuator responsive to said integrated output signal that selectively attenuates the pump light input to propagate in one direction in said cavity.

3. An apparatus for stabilizing the intensities of counterpropagating signals within the cavity of a Brillouin fiber optic gyroscope, comprising:
   means for introducing counterpropagating pump signals into said cavity, said counterpropagating pump signals having a predetermined frequency selected so that said cavity is resonant to said predetermined frequency when said cavity is at rest, said counterpropagating pump signals causing the generation of counterpropagating Brillouin signals within said cavity, said counterpropagating Brillouin signals having first and second frequencies, said first and second frequencies having a frequency difference responsive to rotation of said cavity; and
   means for actively adjusting the length of said cavity when said cavity is rotated to maintain said cavity at a length midway between a resonant length for said first frequency and a resonant length for said second frequency.

4. An apparatus for stabilizing the intensities of counterpropagating signals within the resonant cavity of a Brillouin fiber optic gyroscope, comprising:
   means for introducing counterpropagating pump signals into said resonant cavity, said counterpropagating pump signals having a predetermined frequency, said resonant cavity having a first length when said resonant cavity is at rest, said first length selected to be substantially equal to a resonant length corresponding to said predetermined frequency, said resonant cavity having first and second effective lengths for said counterpropagating pump signals when said resonant cavity is rotating, said first effective length being greater than said first length and said second effective length being less than said first length;
   means for detecting intensities of said counterpropagating pump signals and generating detected signals responsive thereto, said intensities varying as said resonant cavity is rotated and said first and second effective lengths change such that said predetermined frequency of said counterpropagating pump signals is no longer at resonance for either of said counterpropagating pump signals; and
   means responsive to said detected signals for generating a stabilization signal to adjust said length of said resonant cavity to a second length and thereby adjust said first and second effective lengths of said resonant cavity such that said first and second effective lengths differ from said first length by a substantially equal amount, said second length being substantially midway between said first and second effective lengths.

5. An apparatus for stabilizing the intensities of counterpropagating pump signals within a resonant cavity of a Brillouin fiber optic gyroscope, comprising:
   a laser source having an output for providing input light to said Brillouin fiber optic gyroscope;
   a phase modulator connected to modulate said output of said laser source, said phase modulator comprising a signal generator and a piezoelectric cylinder;
   a first coupler that taps a first portion of pump intensity traveling in a first direction in said resonant cavity;

a second coupler that taps a second portion of pump intensity traveling in a second direction in said resonant cavity;

a first detector that detects said first portion and that generates a first electric signal proportional to said detected first portion;

a second detector that detects said second portion and that generates a second electric signal proportional to said detected second portion;

an adder and a synchronous demodulator that receive said first and second electrical signals and that provides a demodulated sum output signal;

an integrator that integrates said demodulated sum output signal and provides an integrated output signal; and a piezoelectric cylinder driven by said integrated output signal that varies the length of said resonant cavity to stabilize said pump intensities.

6. An apparatus for stabilizing the intensities of counterpropagating pump signals within a resonant cavity of a Brillouin fiber optic gyroscope, comprising:

a phase modulator comprising a signal generator and a piezoelectric cylinder;

a first coupler that taps a first portion of pump intensity traveling in a first direction in said resonant cavity;

a second coupler that taps a second portion of pump intensity traveling in a second direction in said resonant cavity;

a first detector that detects said first portion and that generates a first electric signal proportional to said detected first portion;

a second detector that detects said second portion and that generates a second electric signal proportional to said detected second portion;

an adder and a synchronous demodulator that receive said first and second electrical signals and that provides a demodulated sum output signal responsive to said first and second electrical signals;

an integrator that integrates said demodulated sum output signal and provides an integrated output signal; and a piezoelectric cylinder driven by said integrated output signal that varies the length of said resonant cavity to stabilize said pump intensities.

7. The apparatus of claim 5, wherein said phase modulator is connected to the resonant cavity loop of the Brillouin fiber optic gyroscope.

8. An apparatus for controlling the circulating intensities in a Brillouin fiber optic gyroscope, and for stabilizing the intensities of counterpropagating Brillouin waves within the resonant cavity of a Brillouin fiber optic gyroscope, comprising:

means for detecting a difference in circulating Brillouin intensities;

means responsive to said difference in circulating Brillouin intensities for controlling the circulating intensities;

means for detecting counterpropagating pump intensities; and means for combining said counterpropagating pump intensities and for generating a stabilization signal to stabilize the pump intensities at the midpoint between the resonant peaks of the counterpropagating pump intensities.

9. An apparatus for measuring rotation, comprising:

a loop comprised of optical fiber, said loop configured to form a resonant cavity for propagation of light in opposite directions therein;

a source of input pump light waves optically coupled to produce a pair of counterpropagating pump light waves in said loop, said pump light waves resonating in said loop at an intensity sufficient to generate a pair of rotation sensing waves in said loop, each of said pump light waves having an effective path length through said loop, said effective path length varying in accordance with the Sagnac effect when said loop is rotating such that the effective path length for one of said pump light waves is lengthened while the effective path length for the other of said pump light waves is shortened, the intensities of said rotation sensing waves being dependent upon said variations in the effective path length through said loop; and a feedback circuit for controlling the length of said loop to thereby control the effective path lengths for said pump light waves during rotation of said loop, said feedback circuit connected to sense light that has travelled in both directions in said loop and to provide a feedback signal representing a differential intensity between the intensity of one of said pair of rotation sensing waves and the intensity of the other of said pair of rotation sensing waves, said circuit altering the length of said loop in response to said feedback signal such that said differential intensity of said rotation sensing waves is substantially independent of said rotation.

10. The apparatus of claim 9, wherein said feedback circuit comprises a pair of detectors which are optically coupled to detect portions of respective counterpropagating pump light waves.

11. The apparatus of claim 9, wherein said feedback circuit comprises a pair of detectors which are optically coupled to detect portions of respective counterpropagating rotation sensing waves.

12. An apparatus for measuring rotation, comprising:

a loop comprising optical fibers, said loop configured to form a resonant cavity for propagation of light in opposite directions therein;

a source of input pump light waves optically coupled to produce a pair of counterpropagating pump light waves in said loop, said pump light waves resonating in said loop at an intensity sufficient to generate a pair of rotation sensing waves in said loop, each of said pump light waves having an effective path length through said loop, said effective path length varying in accordance with the Sagnac effect when said loop is rotating such that the effective path length for one of said pump light waves is lengthened while the effective path length for the other of said pump light waves is shortened, the intensities of said rotation sensing waves being dependent upon said variations in the effective path length through said loop; and a feedback circuit for controlling the length of said loop to thereby control the effective path lengths for said pump light waves during rotation of said loop, said feedback circuit connected to sense light that has travelled in both directions in said loop, said circuit responsively altering the length of said loop such that the differential intensity of said rotation sensing waves is substantially independent of said rotation, wherein said feedback circuit is additionally connected to alter the intensity of the input pump light waves such that the counterpropagating rotation sensing waves are substantially equalized in intensity.

* * * * *